United States Patent
Anglin et al.

(10) Patent No.: US 7,163,766 B2
(45) Date of Patent: Jan. 16, 2007

(54) ALKALINE CELL WITH FLAT HOUSING

(75) Inventors: David Anglin, Brookfield, CT (US);
Mark Ashbolt, Newtown, CT (US);
Anthony Malgioglio, Stamford, CT (US);
Alexander Shelekhin, Ridgefield, CT (US);
Steven J. Specht, Brookfield, CT (US);
Matthew Sylvestre, Woodbury, CT (US);
Philip Trainer, Sandy Hook, CT (US);
Robert A. Yoppolo, New Milford, CT (US)

(73) Assignee: The Gillette Company, Boston, MA (US)

( * ) Notice: Subject to any disclaimer, the term of this patent is extended or adjusted under 35 U.S.C. 154(b) by 275 days.

(21) Appl. No.: 10/417,363

(22) Filed: Apr. 16, 2003

(65) Prior Publication Data

US 2004/0131929 A1    Jul. 8, 2004

Related U.S. Application Data

(63) Continuation-in-part of application No. 10/336,261, filed on Jan. 3, 2003, now Pat. No. 6,833,215.

(51) Int. Cl.
*H01M 2/06* (2006.01)
*H01M 2/02* (2006.01)

(52) U.S. Cl. ............... 429/229; 429/224; 429/163; 429/179

(58) Field of Classification Search .......... 429/224, 429/229
See application file for complete search history.

(56) References Cited

U.S. PATENT DOCUMENTS

| 4,175,166 | A |  | 11/1979 | Rosansky |
| 4,245,010 | A |  | 1/1981 | Golz |
| 4,256,812 | A |  | 3/1981 | Tamura |
| 4,789,608 | A |  | 12/1988 | Oswald |
| 5,340,666 | A | * | 8/1994 | Tomantschger et al. ...... 429/59 |
| 6,081,992 | A | * | 7/2000 | Kelemen et al. ........... 29/623.1 |
| 6,159,631 | A |  | 12/2000 | Thompson |
| 6,168,883 | B1 |  | 1/2001 | Urry |
| 6,248,472 | B1 |  | 6/2001 | Kelemen |
| 6,521,372 | B1 |  | 2/2003 | Urry |
| 6,780,539 | B1 | * | 8/2004 | Shelekhin et al. .......... 429/159 |

FOREIGN PATENT DOCUMENTS

WO    WO 00/02278    1/2000

OTHER PUBLICATIONS

Handbook of Batteries, Linden, D.R. 2nd, Chapter 34, 1995.*

* cited by examiner

Primary Examiner—Mark Ruthkosky
(74) Attorney, Agent, or Firm—Barry D. Josephs; Thomas G. Krivulka

(57) ABSTRACT

An alkaline cell having a flat housing, preferably of cuboid shape. The cell can have an anode comprising zinc and a cathode comprising $MnO_2$. The housing can have a relatively small overall thickness, typically between about 5 and 10 mm. Cell contents can be supplied through an open end in the housing and an end cap assembly inserted therein to seal the cell. The end cap assembly includes a vent mechanism which can activate, when gas pressure within the cell reaches a threshold level typically between about 100 and 300 psig ($6.89 \times 10^5$ and $20.69 \times 10^5$ pascal gage). The cell can have primary and supplemental vent mechanisms such as welded or thinned regions on the surface of the housing which may activate at different pressure levels. The cathode can be formed of a plurality of stacked slabs having aligned hollow centers with an elongated opening for anode material to be inserted therein.

17 Claims, 11 Drawing Sheets

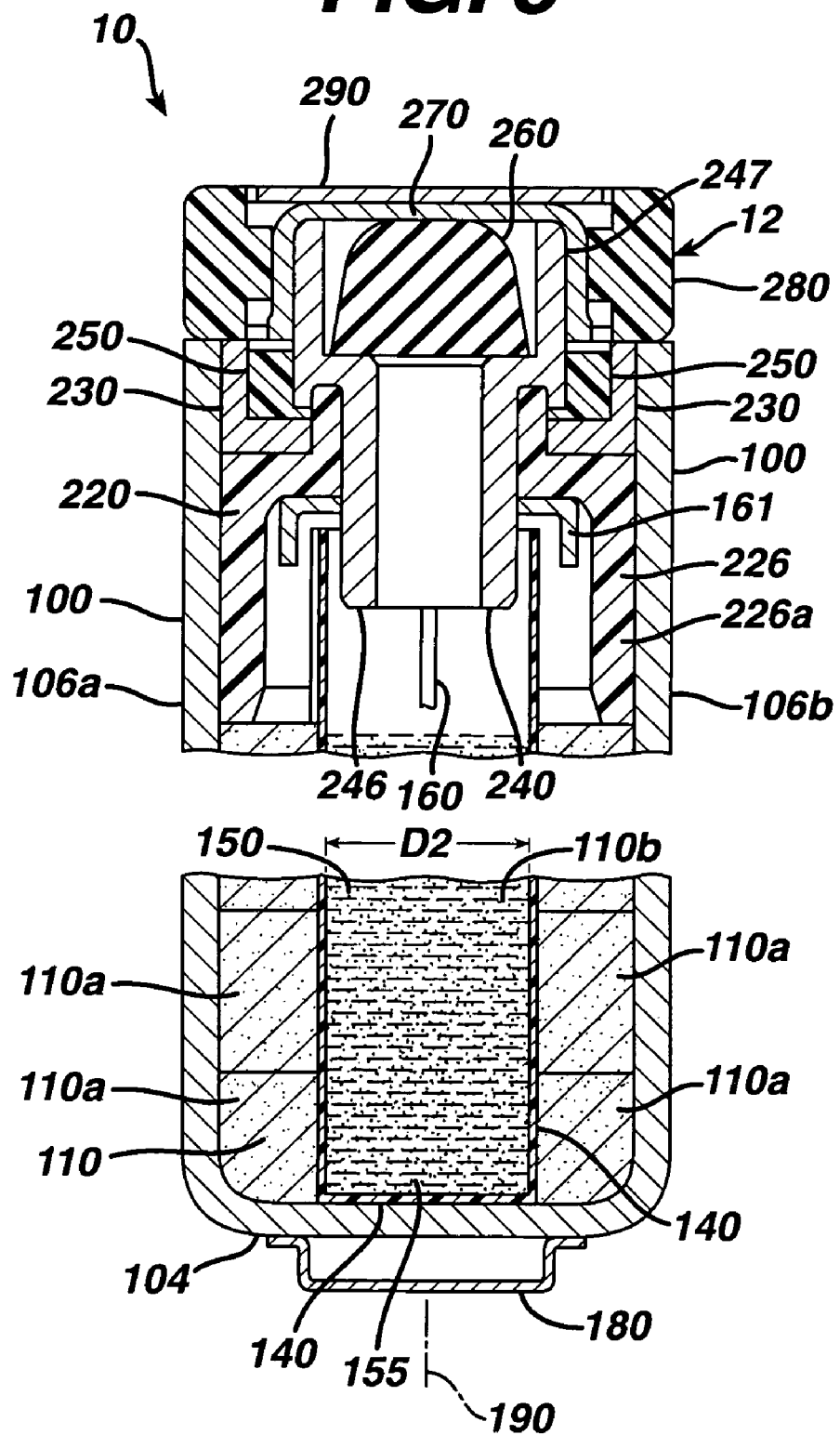

ALKALINE CELL WITH FLAT HOUSING

CROSS REFERENCE TO RELATED APPLICATIONS

This application is a continuation in part of application Ser. No. 10/336,261 filed Jan. 3, 2003 now U.S. Pat. No. 6,833,215.

FIELD OF THE INVENTION

The invention relates to an alkaline battery having a substantially flat outer housing. The invention relates to alkaline battery having an anode comprising zinc, a cathode comprising manganese dioxide, and an electrolyte comprising aqueous potassium hydroxide.

BACKGROUND

Conventional alkaline electrochemical cells have an anode comprising zinc and a cathode comprising manganese dioxide. The cell is typically formed of a cylindrical outer housing. The fresh cell has an open circuit voltage (EMF) of about 1.5 volt and typical average running voltage of between about 1.0 to 1.2 Volt in medium drain service (100 to 300 milliamp). The cylindrical housing is initially formed with an enlarged open end and opposing closed end. After the cell contents are supplied, an end cap assembly with insulating grommet and negative terminal end cap is inserted into the housing open end. The open end is closed by crimping the housing edge over an edge of the insulating plug and radially compressing the housing around the insulating plug to provide a tight seal. The insulating grommet electrically insulates the negative end cap from the cell housing. A portion of the cell housing at the opposing closed end forms the positive terminal.

A problem associated with design of various electrochemical cells, particularly alkaline cells, is the tendency of the cell to produce gases as it continues to discharge beyond a certain point, normally near the point of complete exhaustion of the cell's useful capacity. Electrochemical cells, particularly alkaline cells, are conventionally provided with rupturable diaphragms or rupturable membranes within the end cap assembly. The rupturable diaphragm or membrane may be formed within a plastic insulating member as described, for example, in U.S. Pat. No. 3,617,386.

The prior art discloses rupturable vent membranes, which are integrally formed as thinned areas within the insulating disk included within the end cap assembly. Such vent membranes can be oriented such that they lie in a plane perpendicular to the cell's longitudinal axis, for example, as shown in U.S. Pat. No. 5,589,293, or they may be oriented so that they are slanted in relation to the cell's longitudinal axis as shown in U.S. Pat. No. 4,227,701. U.S. Pat. No. 6,127,062 discloses an insulating sealing disk and an integrally formed rupturable membrane, which is oriented vertically, that is, parallel to the cell's central longitudinal axis. When the gas pressure within the cell rises to a predetermined level the membrane ruptures thereby releasing the gas pressure to the external environment through apertures in the end cap.

Other types of vents are disclosed in the art for relieving gas pressure within an electrochemical cell. One such vent is a reseatable rubber plug, which has been used effectively in connection with small flat rectangular shaped nickel metal hydride rechargeable cells. One such rechargeable battery with the reseatable rubber plug vent is a 7/5-F6 size nickel metal hydride rechargeable battery available commercially as battery model GP14M145 manufactured by Gold Peak Batteries, Hong Kong. The rubber plug is physically compressed to sit tightly within a beveled aperture within a cavity or seat in the cell's end cap assembly. When the cell's internal gas pressure reaches a predetermined level, the plug lifts off its seat thereby letting gas to escape through the underlying aperture. The plug reseats itself when the gas pressure within the cell returns to normal.

Primary alkaline electrochemical cells typically include a zinc anode active material, an alkaline electrolyte, a manganese dioxide cathode active material, and an electrolyte permeable separator film, typically of cellulose or cellulosic and polyvinylalcohol fibers. The anode active material can include for example, zinc particles admixed with conventional gelling agents, such as sodium carboxymethyl cellulose or the sodium salt of an acrylic acid copolymer, and an electrolyte. The gelling agent serves to suspend the zinc particles and to maintain them in contact with one another. Typically, a conductive metal nail inserted into the anode active material serves as the anode current collector, which is electrically connected to the negative terminal end cap. The electrolyte can be an aqueous solution of an alkali metal hydroxide for example, potassium hydroxide, sodium hydroxide or lithium hydroxide. The cathode typically includes particulate manganese dioxide as the electrochemically active material admixed with an electrically conductive additive, typically graphite material, to enhance electrical conductivity. Optionally, small amount of polymeric binders, for example polyethylene binder and other additives, such as titanium-containing compounds can be added to the cathode.

The manganese dioxide used in the cathode is preferably electrolytic manganese dioxide (EMD) which is made by direct electrolysis of a bath of manganese sulfate and sulfuric acid. The EMD is desirable, since it has a high density and high purity. The electrical conductivity (resistivity) of EMD is fairly low. An electrically conductive material is added to the cathode mixture to improve the electric conductivity between individual manganese dioxide particles. Such electrically conductive additive also improves electric conductivity between the manganese dioxide particles and the cell housing, which also serves as cathode current collector in conventional cylindrical alkaline cells. Suitable electrically conductive additives can include, for example, graphite, graphitic material, conductive carbon powders, such as carbon blacks, including acetylene blacks. Preferably the conductive material comprises flaky crystalline natural graphite, or flaky crystalline synthetic graphite, including expanded or exfoliated graphite or graphitic carbon nanofibers and mixtures thereof.

There are small size rectangular shaped rechargeable batteries now available, which are used to power small electronic devices such as MP3 audio players and mini disk (MD) players. These batteries are typically in the shape of a small cuboid (rectangular parallelepiped) somewhat the size of a pack of chewing gum. The term "cuboid" as used herein shall mean its normal geometrical definition, namely, a "rectangular parallelepiped". Such batteries, for example, can be in the form of replaceable rechargeable nickel metal hydride (NiMH) size F6 or 7/5F6 size cuboids in accordance with the standard size for such batteries as set forth by the International Electrotechnical Commission (IEC). The F6 size has a thickness of 6.0 mm, width of 17.0 mm and length of 35.7 mm (without label). There is a version of the F6 size wherein the length can be as great as about 48.0 mm. The 7/5-F6 size has thickness of 6.0 mm, width of 17.0 mm, and length of 67.3 mm. According to the IEC standard, allowed deviation for the 7/5-F6 size in thickness is +0 mm, −0.7 mm, in width is +0 mm, −1 mm, and in length is +0, −1.5 mm. The average running voltage of the F6 or 7/5F6 NiMH rechargeable batteries when used to power miniature digital audio players such as an MP3 audio player or mini disk (MD) players is between about 1.1 and 1.4 volt typically about 1.12 volt.

When used to power the mini disk (MD) player the battery is drained at a rate of between about 200 and 250 milliAmp. When used to power a digital audio MP3 player the battery is drained typically at a rate of about 100 milliAmp.

It would be desirable to have a small flat alkaline battery of the same size and shape as small size cuboid shaped (rectangular parallelepiped) nickel metal hydride batteries, so that the small alkaline size battery can be used interchangeably with the nickel metal hydride battery to power small electronic devices such as mini disk or MP3 players.

It would be desirable to use a primary (nonrechargeble) alkaline battery, preferably a zinc/$MnO_2$ alkaline battery as a replacement for small rectangular shaped rechargeable batteries, particularly small size nickel metal hydride rechargeable battery.

However, a particular problem associated with the design of rectangular (cuboid) shaped primary Zn/$MnO_2$ alkaline battery is that of the tendency of the electrodes to swell during cell discharge. Both anode and cathode swells during discharge.

For a given housing wall thickness, it will be appreciated that a rectangular shaped cell housing is less able to withstand a given increase in cell internal pressure (due to gassing and cathode expansion) than a cylindrical shaped housing of comparable size and volume. This is due to the significantly higher circumferential stress (hoop stress) imposed on a rectangular (cuboid) shaped housing than on a similar size cylindrical housing for any given pressure and housing wall thickness. The problem of bulging or swelling associated with rectangular shaped cells can be overcome by significantly increasing the wall thickness of the housing. However, a significant increase in housing wall thickness can result in significant decrease in available volume for anode and cathode materials for rectangular cells having small overall thickness, e.g. under about 10 mm. The added wall thickness adds to the cost of manufacture of the cell. In this regard it is desirable to keep the housing wall thickness below about 0.50 mm, preferably less than about 0.47 mm.

Thus it is desired to design a small flat (nonrechargeable) alkaline cell, such as an F6 or 7/5-F6 size cell having a rectangular (cuboid) shaped housing, but yet with small housing wall thickness, wherein the housing does not significantly bulge or swell during normal cell usage.

It is desired that such rectangular cell be used as a replacement for a same size flat nickel metal hydride rechargeable cell.

SUMMARY OF THE INVENTION

A principal aspect of the invention is directed to a primary (nonrechargeable) alkaline cell which generates hydrogen gas upon discharge, wherein said cell has an outer casing (housing), an end cap assembly which includes a vent mechanism which allows the hydrogen gas to escape from the cell when gas pressure reaches a predetermined level. The casing has at least a pair of opposing flat walls running along the cell's length.

An end cap assembly is inserted into the casing open end and sealed by crimping or welding to close the casing. The alkaline cell may be in the shape of a parallelepiped, but is desirably in the shape of a cuboid (rectangular parallelepiped). The casing, is thus preferably of cuboid shape, which does not have any integral cylindrical sections. The alkaline cell desirably has an anode comprising zinc, and an aqueous alkaline electrolyte, preferably aqueous solution of potassium hydroxide.

An end cap assembly includes a venting mechanism and preferably a rectangular shaped metallic cover. The cover is used to close to the open end of the casing after the cell contents are inserted into the casing. The metallic cover can form the cell's negative terminal if insulation is inserted between the edge of the said cover and the casing edge. Alternatively, the cover can be welded directly to the casing edge. If the cover is welded to the casing edge, a separate end cap insulated from the cover can be employed in electrical communication with the anode to function as the cell's negative terminal. The casing is positive and forms the cell's positive terminal.

The cathode comprising $MnO_2$ is inserted, preferably in the form of a plurality of compacted slabs or disks. The cathode slabs or disks are preferably rectangular shaped, each having a central hollow core running through the slab's thickness. The slabs are inserted so that they are stacked one on top of another. The slabs are aligned along the cell's length, so that their outside surface is in contact with the inside surface of the casing. The stacked cathode slabs form a central hollow core running along the cell's longitudinal axis. The central hollow core within the stacked cathode slabs forms the anode cavity. The inside surface of each cathode slab, which defines the central hollow core (anode cavity) within the slab, is preferably a curved surface. Such curved inside surface improves the mechanical strength of the slab during transfer and handling and also provides more uniform contact between the electrolyte permeable separator and the cathode. The separator is inserted into the cell's central hollow core (anode cavity) so that the outside surface of the separator abuts and closely contacts the inside surface of the cathode. An anode slurry comprising zinc particles is inserted into the anode cavity with the separator providing the interface between anode and cathode. The end cap assembly has an elongated anode current collector, which is inserted into the anode slurry and in electrical communication with the cell's negative terminal. The end cap assembly has an insulating sealing member, which insulates such anode current collector from the cell's outer casing.

The anode cavity preferably has an elongated or oblong configuration when the anode cavity is viewed in plan view upon taking a cross section of a cathode slab along a plane perpendicular to the cell's longitudinal axis.

In an aspect of the invention the end cap assembly has a vent mechanism, which preferably is a reseatable rubber plug compressed into a cavity within the insulating sealing member or a cavity within a metallic rivet passing through the insulating sealing member. When gas pressure within the cell reaches a predetermined threshold level, the plug lifts up (unseats) enough to let the gas escape from the cavity. The plug then reseats within the cavity when gas pressure subsides. The plug can be shaped such that there is a greater amount of free space within the cavity housing said plug. For example, the plug can have a cylindrical base and integrally formed cylindrical body of smaller diameter extending upward therefrom. Preferably there is between about 10 and 40 percent free space within the cavity housing the plug. The greater amount of free space within the cavity housing the plug better accommodates KOH electrolyte which may seep into and crystallize within the cavity should the cell be abused by the user by inadvertently subjecting the cell to charging. Alternatively, the vent mechanism may comprise a rupturable membrane, which can form an integral part of the insulating sealing member.

When the reseatable plug vent mechanism is employed, it is designed to activate when the cell's internal gas pressure reaches a threshold level of between about 100 and 300 psig ($6.895 \times 10^5$ and $20.69 \times 10^5$ pascal gage), desirably between about 100 and 200 psig ($6.895 \times 10^5$ and $13.79 \times 10^5$ pascal gage). The outer casing (housing) is desirably of steel, preferably of nickel-plated steel. The casing wall thickness is desirably between about 0.30 and 0.50 mm, typically between about 0.30 and 0.45 mm, preferably between about 0.30 and 0.40 mm, more desirably between about 0.35 and 0.40.

The vent system can be formed of a plurality of supplemental venting mechanisms in addition to the reseatable plug or such plurality of venting mechanisms may be employed instead of the reseatable plug. For example in the case where the reseatable plug is included, one such supplemental venting system can be designed to activate when gas pressure within the cell reaches a design threshold pressure $P1$, preferably somewhat higher than the pressure at which the plug unseats. A second supplemental venting mechanism can be provided which activates at a pressure $P2$ greater than the design rupture pressure $P1$. The first supplemental venting mechanism activating at pressure $P1$ provides added safety in the event that the plug is not functioning properly. The second supplemental vent which activates at a pressure $P2$ provides additional safety in the event that the cell is subjected to an extreme abusive situation causing gas pressure to rise abruptly within the cell. In another aspect the plug can be eliminated, in which case the venting mechanism activating at a design pressure $P1$ becomes the primary venting mechanism and the venting mechanism activating at a pressure $P2$ higher than $P1$ becomes the secondary venting mechanism.

In an aspect of the invention the first and second supplemental venting systems can be formed by providing a weak and strong laser weld on the boundary surface of the cell interior. Such boundary surface may also be referenced herein as the pressure boundary surface around the cell interior, since such surface holds gas pressure therein until a portion of said boundary surface ruptures or is opened. The weak and strong welds are preferably continguous. The weak weld may be designed to rupture at a pressure, $P1$, typically between about 400 and 800 psig ($2758 \times 10^3$ and $5515 \times 10^3$ pascal gage). The strong weld may be designed to rupture in a catastrophic situation, for example, should gas within the cell reached a pressure between about 800 and 2500 psig ($5515 \times 10^3$ and $17235 \times 10^3$ pascal gage).

In one aspect the supplemental venting system can be achieved by laser welding the edges of a metal cover or plate to the inside surface of the casing in order to seal the open end of the cell. A portion of the weld path can be in the form of a weak weld which can be designed to rupture and release gas pressure in the event gas pressure within the cell builds up to a level between about 400 and 800 psig ($2758 \times 10^3$ and $5515 \times 10^3$ pascal gage). The strong weld can be designed to rupture at a higher pressure, for example, between about 800 and 2500 psig ($5515 \times 10^3$ and $17235 \times 10^3$ pascal gage), more typically between about 800 and 1600 psig ($5515 \times 10^3$ and $11030 \times 10^3$ pascal gage). The negative terminal plate can be stacked over the metal cover with an electrically insulating member therebetween.

In another aspect a groove with underlying thinned material region can be formed on the cell's pressure boundary surface. Such groove may be employed with or without the laser weld. There may be one laser weld designed to rupture at a pressure $P1$ and a groove on the casing body surface with underlying thinned region designed to rupture at a pressure $P2$ higher than $P1$. Conversely the underlying thinned region of the groove may be designed to rupture at a pressure $P1$ and the laser weld may be designed to rupture at a pressure $P2$ greater than $P1$.

In another aspect there may be formed a plurality of spaced apart grooves on the casing body each with underlying thinned material regions: one designed to rupture at a pressure $P1$ and a second designed to rupture at a pressure $P2$ higher than $P1$. Such embodiment may be employed with or without the reseatable plug. The thickness of the underlying thinned material region can be adjusted to achieve the desired rupture pressure. Desirably rupture pressure $P1$ is between about 250 and 800 psig ($1724 \times 10^3$ and $5515 \times 10^3$ pascal gage), for example between about 400 and 800 psig ($2758 \times 10^3$ and $5515 \times 10^3$ pascal gage. The rupture pressure $P2$ may be between about 800 and 1600 psig ($5515 \times 10^3$ and $11030 \times 10^3$ pascal gage). Although not intending to be limited to any particular cell size or shape, such design has been determined to be particularly applicable to 7/5-F6 size cuboid shaped alkaline cells.

In another aspect of the invention at least the widest portion of the anode current collector is surrounded by an insulating barrier between such wide portion of the current collector and the cell's casing. It has been determined that narrow gaps, for example, of less than about 0.5 mm, between any surface of the anode current collector and the cell's casing inside surface can provide regions in which corrosive by-products can occur during cell discharge. This in turn can passivate neighboring regions of the anode current collector and promote gassing. It has been determined that it is desirable to provide the insulating sealing member with a downward extending skirt which surrounds wide portions of the current collector. This produces a barrier between the current collector wide portions and cell casing and reduces the production of corrosive chemicals or gassing in that space during cell discharge. In a preferred aspect the widest part of the anode current collector is between about 0.5 and 2 mm, preferably between about 0.5 and 1.5 mm from the casing inside surface and the insulating skirt preferably surrounds such wide portions of the anode current collector. These design features were determined to reduce the production of corrosive chemicals between anode and cell casing. Such corrosive chemicals can include complex metal containing substances or compounds, which can promote gassing and interfere with proper cell performance. The resolution of this problem made the resealable rubber vent plug assembly suitable as a viable vent mechanism for the flat primary alkaline cell of the invention.

In an aspect of the invention the cell is balanced so that the cathode is in excess. Desirably the cell is balanced so that the ratio of theoretical capacity of the $MnO_2$ (based on a theoretical specific value of 370 mAmp-hr per gram $MnO_2$) divided by the mAmp-hr capacity of zinc (based on a theoretical specific value of 820 mAmp-hr per gram zinc) is between about 1.15 and 2.0, desirably between about 1.2 and 2.0, preferably between about 1.4 and 1.8. It has been determined that design of the flat alkaline cell herein at higher ratio of theoretical capacity of $MnO_2$ to theoretical capacity of zinc reduces the amount of overall swelling. The above ratio of theoretical capacity of $MnO_2$ to theoretical capacity of zinc can feasibly be as high as about 2.5 or even up to about 3.0 in order to reduce overall swelling, but cell design at such higher ratios above about 2.0 more significantly reduces cell capacity and thus becomes less desirable from that standpoint. It is not known with certainty why this occurs. It may be in part due to the fact the most all of the zinc gets discharged. In such case there is little if any zinc hydroxide intermediates left in the anode, which can cause swelling.

The ratio of anode thickness to the casing outside thickness is desirably between about 0.30 and 0.40. (Such thicknesses are measured along a plane perpendicular to the cell's longitudinal axis, across the outside thickness of the cell.) Swelling of the cell upon discharge is thereby controlled allowing a flat or rectangular shaped alkaline cell to be used as a primary power source for electronic devices such as portable digital audio players and the like.

In a specific aspect the alkaline cell has the overall shape of a small cuboid (rectangular parallelepiped), typically having an outside thickness between about 5 and 10 mm, particularly a thickness between about 5 and 7 mm. The outside thickness is measured by the distance between the outside surface of opposing sides of the housing defining the short dimension of the cell. In such embodiment the primary (nonrechargeable) alkaline cell of the invention can be used, for example, as a replacement for small size flat rechargeable cells. In particular such primary alkaline cell can be used as a replacement for same sized rechargeable nickel metal hydride cells, for example, the 7/5-F6 size rectangular rechargeable nickel metal hydride cell.

BRIEF DESCRIPTION OF THE DRAWINGS

FIG. 3 is a cross sectional view of the cell shown in FIG. 1A taken along view lines 3—3.

DETAILED DESCRIPTION

Figure 1:
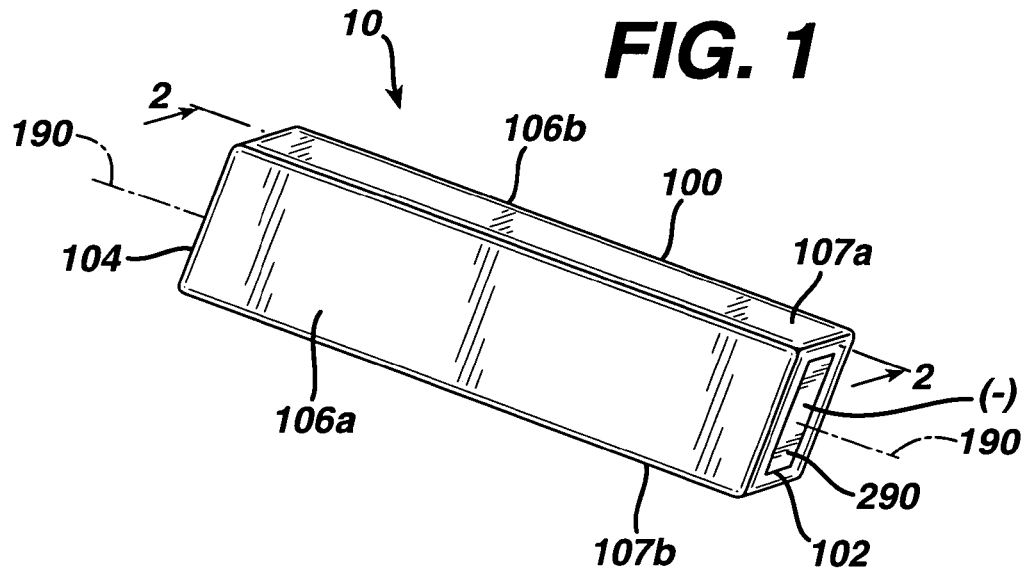
FIG. 1 is perspective view of the flat alkaline cell of the invention showing the cell's negative terminal end.

A specific embodiment of the flat alkaline cell 10 of the invention is shown in FIGS. 1–5. Cell 10 has at least two flat opposing sides, which are parallel to the cell's longitudinal axis. Cell 10 is preferably of rectangular shape, that is, a cuboid, as shown best in FIGS. 1 and 1A. The term "cuboid" as used herein shall mean the geometrical definition, which is a rectangular parallelepiped. However, cell 10 can also be a parallelepiped. Outer casing 100 as shown in the figures preferably is of cuboid shape, thus without having any integral cylindrical sections. Cell 10 typically has a thickness smaller than its width and a width smaller than its length. When cell thickness, width, and length are of different dimensions, the thickness will normally be considered the smallest of these three dimensions.

The cell 10 preferably comprises a cuboid shaped casing (housing) 100, preferably of nickel plated steel. In the embodiment shown in the figures, casing (housing) 100 is bounded by a pair of opposing large flat walls 106a and 106b; a pair of opposing small flat walls 107a and 107b; a closed end 104; and opposing open end 102. The cell's thickness is defined by the distance between the outside surfaces of walls 106a and 106b. The cell's width is defined by the distance between the outside surface of walls 107a and 107b. Casing 100 is desirably coated on its inside surface with a layer of carbon or indium to improve conductivity. Cell contents comprising a anode 150, cathode 110 and separator 140 therebetween are supplied through the open end 102. In a preferred embodiment the anode 150 comprises particulate zinc, the cathode 110 comprises MnO2. An aqueous solution of potassium hydroxide forms a portion of the anode and cathode.

Figure 2:
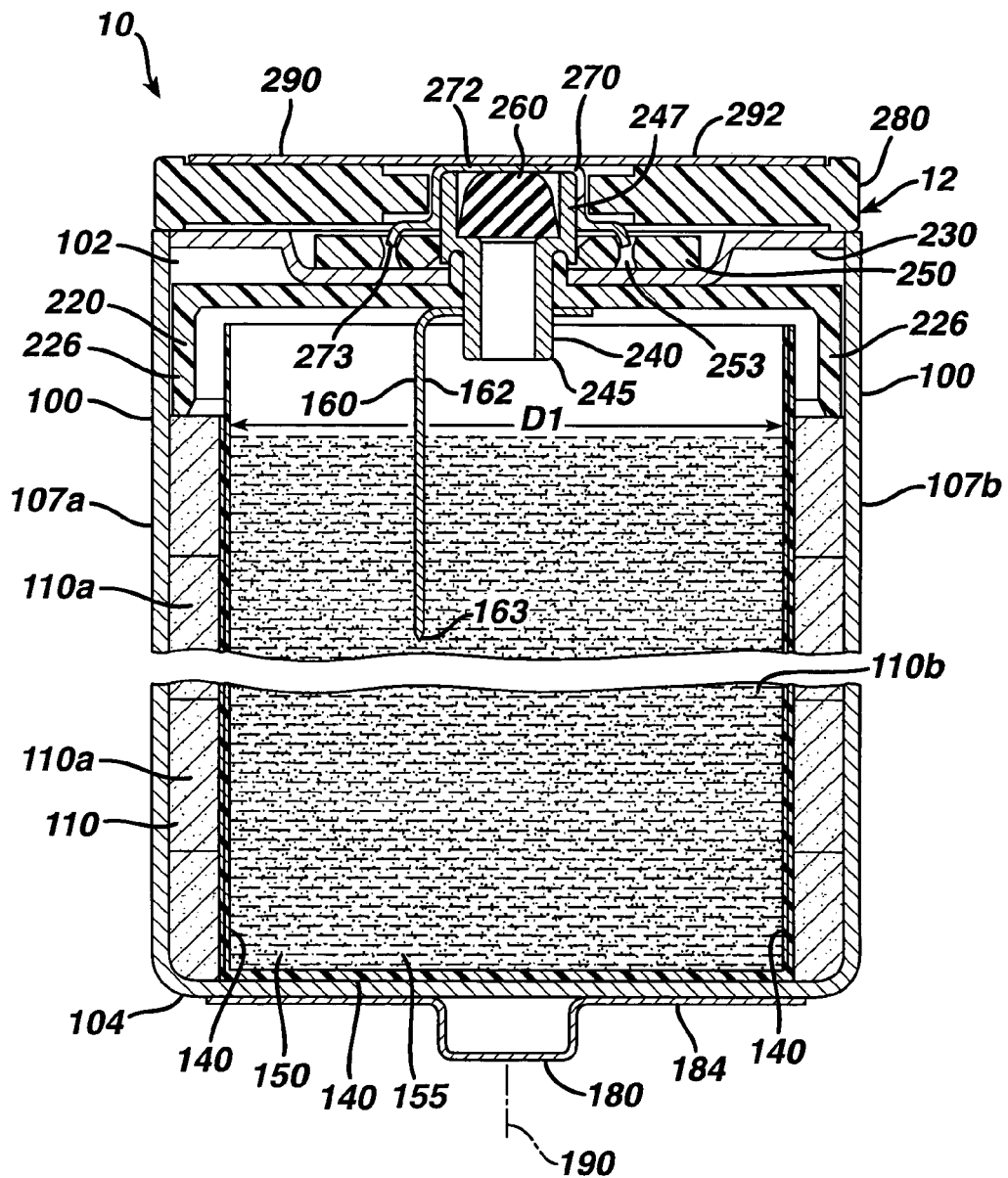
FIG. 2 is a cross sectional view of the cell shown in FIG. 1A taken along view lines 2—2.
Figure 3A:
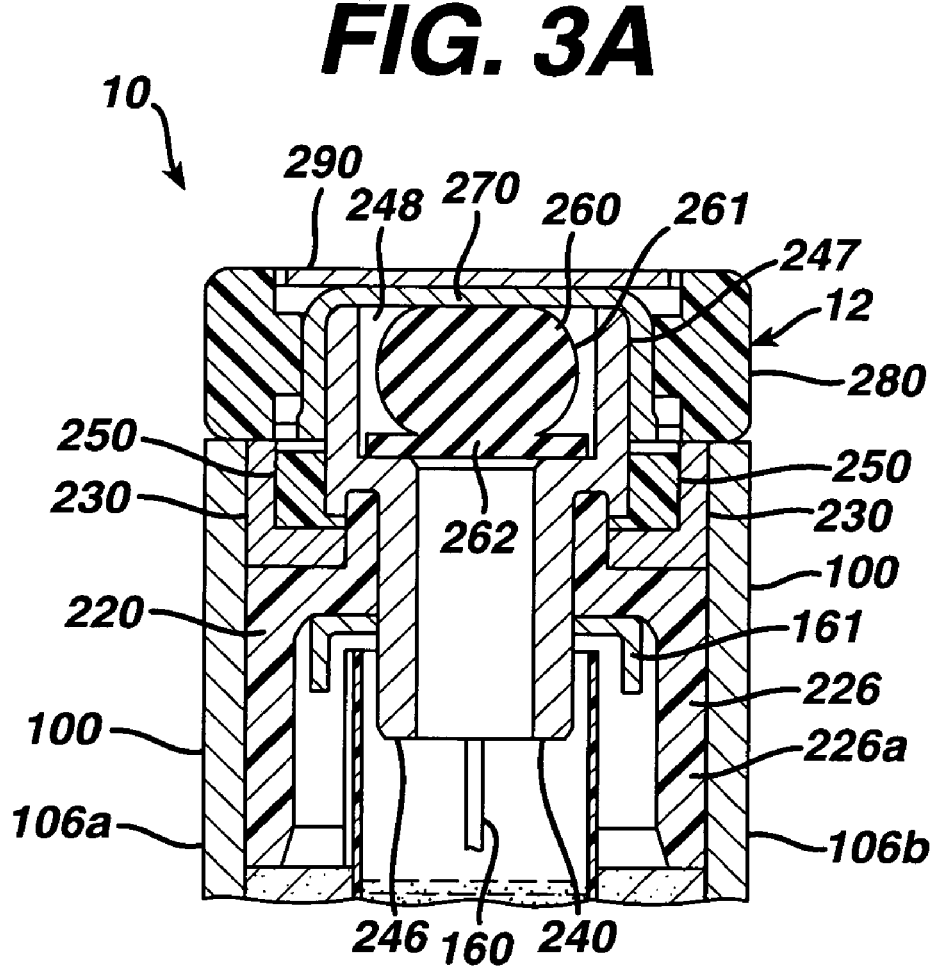
FIG. 3A is a cross sectional view of the cell shown in FIG. 1A taken along view lines 3—3 and showing a modified plug design.
Figure 3A:
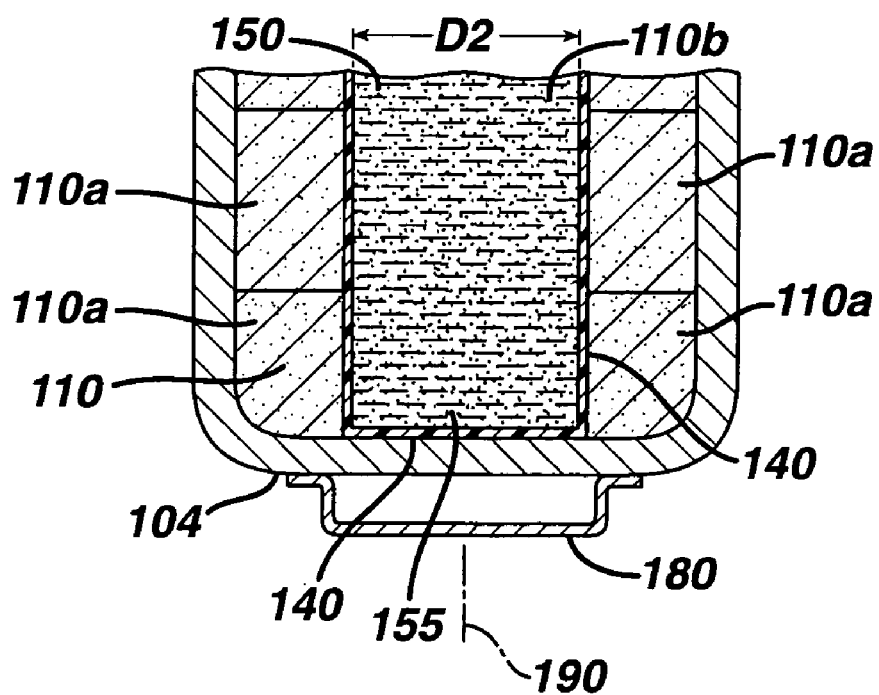
Figure 5:
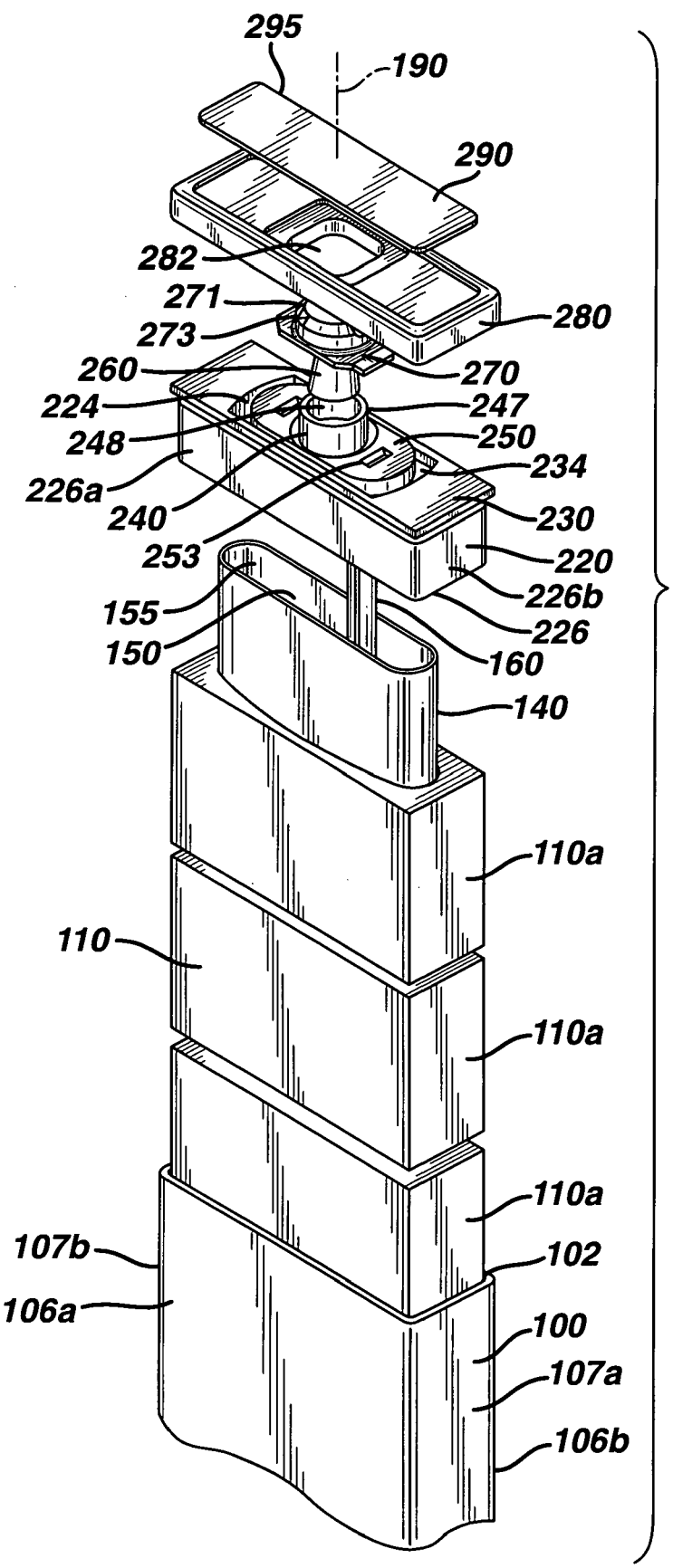
FIG. 5 is an exploded view showing installation of the cell contents and end cap assembly into the cell casing (housing).

The cathode 110 may be in the form of a plurality of slabs 110a having a hollow central core 110b through its thickness, shown best in FIG. 5. The cathode slabs 110a preferably are of overall rectangular shape. The cathode slabs 110a are inserted into casing 100 and stacked vertically one on top of the other along the cell's length as shown in FIGS. 2, 3 and 5. Each cathode slab 110a may be recompacted after it is inserted into casing 100. Such recompaction assures that the outside surface of each cathode slab 110a is in intimate contact with the inside surface of casing 100. Preferably, the hollow central cores 110b within cathode slabs 110a are aligned to form one continuous central core along the cell's longitudinal axis 190, for receiving anode slurry 150. Optionally, the cathode slab 110a closest to the closed end 104 of casing 100, can have a bottom surface which abuts and covers the inside surface of closed end 104.

Cathode slabs 110a can be die cast or compression molded. Alternatively, cathode 110 can be formed of cathode material which is extruded through a nozzle to form a single continuous cathode 110 having a hollow core. Cathode 110 can also be formed of a plurality of slabs 110a with hollow core 110b, wherein each slab is extruded into casing 100.

After cathode 110 is inserted, an electrolyte permeable separator 140 is then positioned within central core 110b of each slab 110a so that the outside surface separator 140 abuts the inside surface of the cathode as shown in FIGS. 2, 3, and 5. The inside surface of each cathode slab 110a, which defines said hollow central core 110b, is preferably a curved surface. Such curved inside surface improves the mechanical strength of the slab during transfer and handling and also provides more uniform contact between the separator 140 and the cathode 110.

The central core 110b of slabs 110a are aligned to form one continuous core as above described. After separator 240 is inserted, the continuous core forms the anode cavity 155 for housing anode material 150. The anode cavity is within the central core of cathode slab 110a which is devoid of cathode material. The anode cavity 155 has an elongated or oblong shape when viewed in plan view (FIG. 4B) upon taking a cross section of a cathode slab 110a along a plane perpendicular to the cell's longitudinal axis 190. The cross section of the anode cavity 155 defined by boundary perimeter 156 may be elliptical or substantially elliptical. Cavity 155 has a long dimension D1 which is greater than its short dimension D2. Cavity 155 thus can have a diameter (or width), D1, which is greater along the path of a plane parallel to the wide side (106a or 106b) of the cell than its diameter (or width), D2, in the direction of a plane parallel to a narrow side (107a or 107b) of the cell. Thus, by way of nonlimiting example, anode cavity 155 may take the shape of an ellipse or appear to be substantially elliptical when viewed in cross section along a plane perpendicular to the central longitudinal axis 190. The opposing long boundary edges 158a and 158b of the anode cavity when viewed in cross section (FIG. 4B) may be flat or substantially flat so that the overall configuration is not a perfect ellipse, but nevertheless is of an elongated or oblong shape as shown.

The cavity 155 has an elongated or oblong shape when viewed in cross section (FIGS. 4B, 4C and 4D) obtained by cutting a cathode slab 110a by a plane perpendicular to the cell's central longitudinal axis 190. Such elongated shape can be an elongated polygon or a rectangular shape as shown in FIG. 4C. The axes defining the long dimension D1 and short dimension D2 of cavity 155 defined by boundary perimeter 156 may be skewed as shown in FIG. 4D. Preferably, the cavity 155 when viewed in cross section (FIG. 4B) obtained by cutting a cathode slab 110a by a plane perpendicular to the cell's central longitudinal axis 190 (FIG. 1A) has at least a portion of its boundary perimeter 156 which is curved. Cavity 155 is desirably of an oblong configuration. In a preferred embodiment substantially all of the boundary perimeter 156 defining cavity 155 is curved. In particular it is desirable that at least the opposing surfaces 157a and 157b of cavity 155 closest to the opposing narrow sides 107a and 107b of the cell are curved as shown best in FIG. 4B. Preferably, substantially all of the perimeter 156 of cavity 155 when viewed in cross section as above described is curved. The opposing long edges 158a and 158b are preferably outwardly curved (convex) when viewed from outside casing 100 as shown in FIG. 4B. However, long edges 158a and 158b may be flat or substantially flat. Alternatively, long edges 158a and 158b may be slightly inwardly curved (concave) or lightly outwardly curved (convex) or may be of convoluted curvature, for example having alternating convex and concave surfaces. Similarly the short edges 157a and 157b may be slightly inwardly curved (concave) or lightly outwardly curved (convex) or may be of convoluted curvature, for example, having alternating convex and concave surfaces. In any cross section of a cathode slab 110a taken along a plane perpendicular to the cell's longitudinal axis, there is a long dimension D1 of cavity 155 representing its maximum length within the plane and the short dimension D2 representing its maximum width within said plane. The long diameter (D1) will normally be in the direction along a plane parallel to a wide side (106a or 106b) of the cell and the small diameter (D2) is in the direction along a plane parallel to a narrow side (107a or 107b) of the cell as shown in FIG. 4B. Cavity 155 when viewed in cross section as above described has at least some curvature and is characterized in that the ratio of D1/D2 is greater than 1.0 reflecting that it is of elongated or oblong configuration. The shape of the cavity 155 when viewed in a cross section taken along a plane perpendicular to longitudinal axis 190 desirably has a symmetrical oblong configuration having a ratio of D1/D2 greater than 1.0. In such case the dimensions D1 and D2 are perpendicular to each other as shown in FIG. 4B. By way of a specific nonlimiting example, the shape of cavity 155 in when viewed in such cross section is of oblong shape and may be elliptical or substantially elliptical.

Anode 150, is preferably in the form of a gelled zinc slurry comprising zinc particles and aqueous alkaline electrolyte. The anode slurry 150 is poured into the central core 155 of the cell along the cell's longitudinal axis 190. Anode 150 is thus separated from direct contact with cathode 110 by separator 140 therebetween.

Figure 1A:
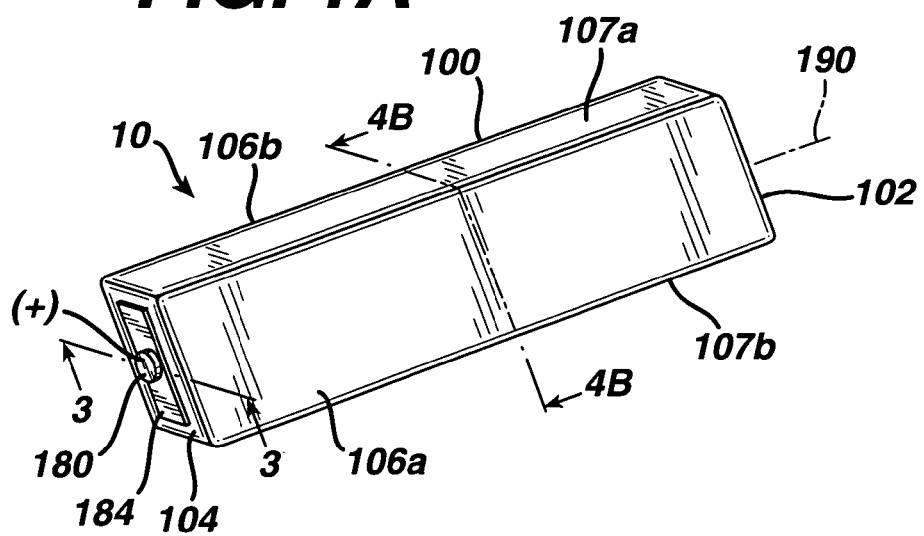
FIG. 1A is a perspective view of the flat alkaline cell of FIG. 1 showing the cell's positive terminal end.

After the cell contents are supplied, the cell assembly 12 (FIG. 4) is then inserted into the open end 102 to seal the cell and provide a negative terminal 290. The closed end 104 of the casing can function as the cell's positive terminal. The closed end 104 can be drawn or stamped to provide a protruding positive pip or else a separate end plate 184 having a protruding pip 180 can be welded to the closed end 104 of the casing as shown in FIG. 1A.

Figure 4:
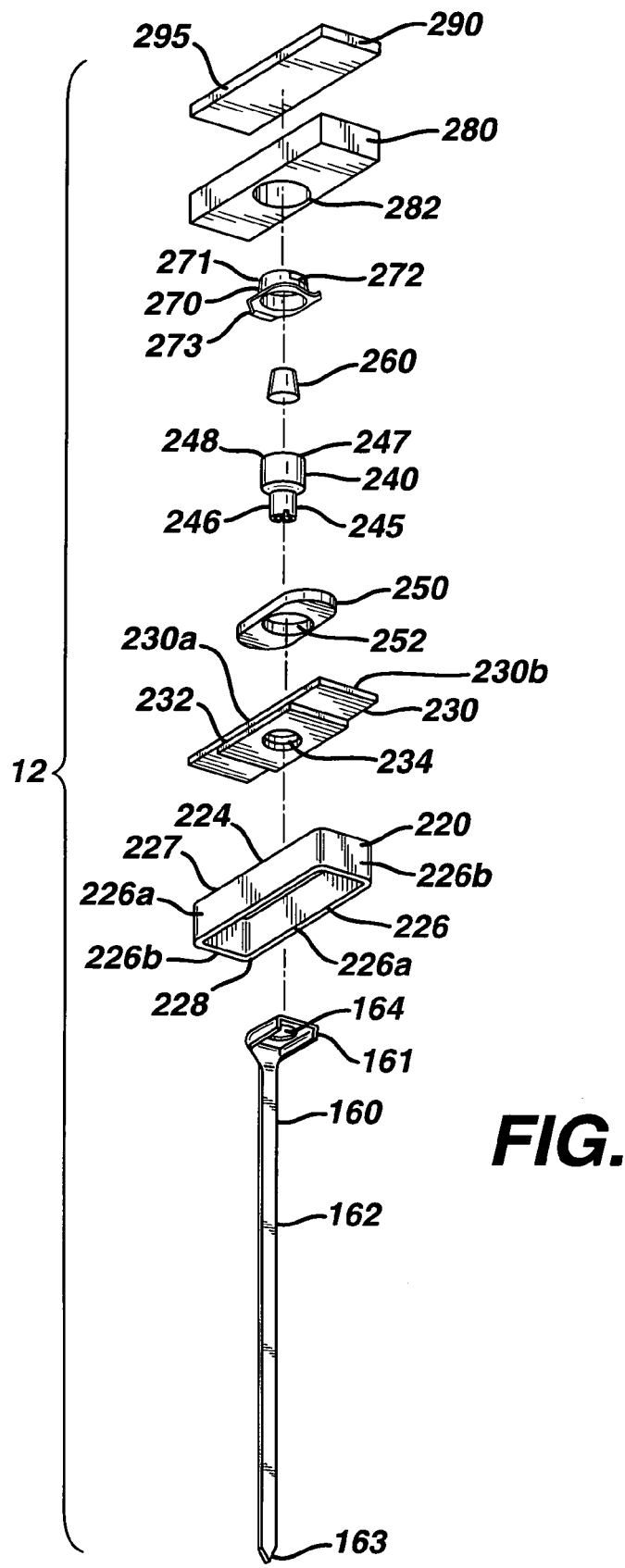
FIG. 4 is an exploded view of the components comprising the end cap assembly for the flat alkaline cell.

The components comprising a specific embodiment of the end cap assembly 12 are shown best in FIG. 4. End cap assembly 12 comprises an elongated anode current collector 160; an insulating sealing member 220; a metal cover 230 which lies over sealing member 220; a metal rivet 240 which penetrates partially through insulating sealing member 220; a plastic spacer 250, which insulates rivet 240 from metal cover 230; a rubber vent plug 260 seated within a cavity 248 in rivet 240; a vent pip cap 270 over rubber plug 260; a plastic extender 280; and a negative terminal plate 290 over plastic extender 280.

It is herein acknowledged that rubber vent plug 260 as seated within a cavity 248 within a rivet 240, and vent pip cap 270 over rubber plug 260 have been disclosed and used in connection with a commercial 7/5-F6 size rectangular rechargeable nickel metal hydride battery Model No. GP14M145 made by Gold Peak Batteries, Hong Kong. However, Applicants of the present patent application herein have determined that the end cap assembly as a whole in said nickel metal hydride rechargeable battery Model No. GP14M145 causes corrosion and promotes gassing if applied to a primary zinc/MnO$_2$ alkaline cell. Such corrosion was found to occur between the elongated current collector and the inside surface of the cell housing because the widest part of the current collector was very close (less than about 0.5 mm) to the cell housing inside surface. It will be appreciated that a wide portion, namely flange 161, of current collector 160 is employed in connection with the reseatable vent plug design. Such wide portion of the current collector (flange 161) is required because the current collector is riveted to the underside of insulating sealing member 220. Thus, flange 161 must be sufficiently wide to fasten base 246 of rivet 240 thereto. If the cell 10 is a small size flat cell, for example a cuboid shaped cell having an overall thickness between about 5 and 10 mm, an edge of flange 161 will, therefore, terminate close to an inside surface of casing 100.

Applicants have modified the subassembly comprising current collector 160 and insulating sealing member 220 by redesigning the insulating sealing member 220 to provide it with a circumventing skirt 226. The insulating sealing skirt 226 surrounds the widest part, namely flange 161 of anode current collector 160. Insulating skirt 161 thus provides a barrier between the edge of current collector flange 161 and the inside surface of casing 100. The insulating skirt 161 has been determined to reduce the production of corrosive chemicals, typically metal containing complexes or compounds, in the space between flange 161 and the inside surface of casing 100 during cell discharge. Such corrosive chemicals, if produced in quantity, can interfere with cell performance and promote cell gassing. Also, in the modified design herein described the widest part of the anode current collector 160, namely, flange 161 is between about 0.5 and 2 mm, preferably between about 0.5 and 1.5 mm from the housing inside surface. This in combination with the use of insulating sealing skirt 226 surrounding current collector flange 161 was determined to prevent the production of any significant amount of corrosive chemicals between current collector wide portion (flange 161) and the casing 100 inside surface. Such modified design of the invention in turn made the reseatable rubber vent plug assembly suitable as a viable vent mechanism for the flat primary alkaline cell herein described.

The components of the end cap assembly 12 shown best in FIGS. 4 and 5 can be assembled in the following manner: The anode current collector 160 comprises an elongated shaft or wire 162 terminating at its bottom end in tip 163 and terminating at its top end in an outwardly extending integral flange 161, which is preferably at right angles to shaft 162. Thus when the current collector 160 is inserted into anode 150, the edge of outwardly extending flange 161 can be closer to the inside surface of casing 100 than shaft 162. Insulating sealing member 220 has a top panel 227 and opposing open bottom 228. Insulating sealing member 220 is preferably of nylon 66 or nylon 612, which is durable, resistant to alkaline, and permeable to hydrogen. Alternatively, insulating sealing member 220 may be composed of polypropylene, talc filled polypropylene, sulfonated polyethylene or other polyamide (nylon) grades, which are durable and hydrogen permeable. Insulating member 220 is preferably rectangular so that it can fit snugly within the open end 102 of casing 100. The opposing side walls 226a and opposing end wall 226b extending from top end 227 of insulating member 220 forms a downwardly extending skirt 226 around top panel 227. Skirt 226 defines the bounds of open bottom 228 of said insulating sealing member 220. There is an aperture 224 through the top panel 227. There is a metal cover 230 which can be a metal plate having an aperture 234 therethrough. There is a metal rivet 240 having a head 247 and base 245. Rivet 240 can be of nickel plated steel or stainless steel. Rivet 240 has a cavity 248 within head 247. Cavity 248 passes completely through rivet head 247 and the rivet shaft 245. The flange 161 of current collector 160 is inserted into the open bottom 228 of insulating sealing member 220 so that the flange 161 of the current collector 160 is surrounded and protected by insulating skirt 226 of said sealing member 220. As shown in FIG. 4, flange portion 161 of current collector 160 has an aperture 164 therethrough. The base 246 of rivet 240 can be passed through said aperture 164 and riveted to said flange 161 to keep the current collector 160 in electrical contact with said rivet.

In such embodiment insulating skirt 226 provides a barrier between flange 161 of the current collector and the inside surface of the cell's casing 100. It has been determined that narrow gaps, for example, less than about 0.5 mm, between any surface of the anode current collector 160 and the cell's casing 100 inside surface can provide regions in which corrosive by-products can occur during alkaline cell discharge. This in turn can passivate neighboring regions of the anode current collector 160 and promote gassing. The downward extending skirt 226 of insulating sealing member 220 is intended to surround outwardly extending portions of the current collector 160 such as integral flange 161, thereby providing a barrier between the widest portions of the current collector 160 and casing 100. This has been determined to resolve the corrosion problem and reduce gassing. Applicant has modified the design by redesigning the widest part of the current collector preferably by providing a barrier, namely an insulating skirt 226 surrounding the widest part, namely flange 161 of anode current collector 160. The placement and effect of skirt 226 are described in greater detail in the following paragraphs herein. In Applicant's modified design herein described the widest part of the anode current collector 160, namely flange 161, is between about 0.5 and 2 mm, preferably between about 0.5 and 1.5 mm from the housing inside surface. Also, circumventing insulating skirt 226 provided a barrier between current collector flange 161 and casing 100. These design features were determined to resolve the corrosion problem and make the reseatable rubber vent plug assembly suitable as a viable vent mechanism for the flat primary alkaline cell of the invention.

In forming end cap assembly 12, the flange portion 161 of current collector 160 is positioned so that aperture 164 therethrough is aligned with aperture 224 through top panel 227 of the insulating sealing member 220. The metal cover 230 is positioned over the top panel 227 of the insulating sealing member 220 so that aperture 234 through metal cover 230 is aligned with aperture 224. A plastic spacer disk 250 is inserted over metal cover 230 so that the aperture 252 through spacer disk 250 is aligned with aperture 234 of metal cover 230. In the preferred embodiment (FIG. 4), the base 246 of rivet 240 is passed through aperture 252 of plastic spacer 250 and also through aperture 234 of metal cover 230. Base 246 of rivet 240 is also passed through aperture 224 of insulating sealing member 220 and aperture 164 of current collector flange 161. Plastic spacer 250 insulates rivet 240 from metal cover 230. The base 246 of rivet shaft 245 extends through aperture 224 of the insulating sealing member 220 and underlying aperture 164 within the top flange portion 161 of anode current collector 160. Base 246 of the rivet shaft can be hammered into place against the bottom surface of current collector flange 161 using an orbital riveter or the like. This locks the rivet shaft in place within aperture 224 of the insulating sealing member 220 and also secures the current collector 160 to the rivet shaft 245. This keeps the current collector 160 in permanent electrical contact with rivet 240 and prevents the rivet shaft 245 from being removed or dislodged from aperture 224 of the insulating sealing member 220. The rivet head 247 is tightly seated over plastic spacer 250. This forms a subassembly comprising rivet 240, plastic spacer 250, metal cover 230, insulating sealing member 220 and anode current collector 160. The subassembly can be stored until ready for further assembly.

The assembly process is completed by inserting rubber vent plug 260 into cavity 248 within the rivet head 247. Plug 260 is preferably in a truncated conical shape and is designed to fit snugly within cavity 248 of rivet head 247. Plug 260 is preferably of a compressible, resilient material which is resistant to alkaline electrolyte. A preferred material for plug 260 is a rubber, preferably a neoprene or EPDM (ethylenepropylene diene terpolymer) rubber or other alkaline resistant compressible rubber. The surface of the plug 240 is preferably coated with a nonwetting agent such as Teflon (polytetrafluoroethylene), asphalt or a polyamide. A metal vent pip cap 270 is then inserted over plug 260. The vent pip cap 270 is pressed onto plug 260 with force sufficient to compress the plug by about 0.55 mm. This has been determined to provide a seal which can withstand internal gas pressure buildup of about 200 psig ($13.79 \times 10^5$ pascal). Plug 260 compression can be adjusted so that the seal can withstand internal pressures typically between about 100 and 300 psig ($6.895 \times 10^5$ and $20.69 \times 10^5$ pascal gage), desirably between about 100 and 200 psig ($6.895 \times 10^5$ and $13.79 \times 10^5$ pascal gage). Higher degree of compression of plug 260 is also possible, if desired, to enable the seal to withstand higher pressures, that is, higher than 300 psig ($20.69 \times 10^5$ pascal gage). Conversely reduced compression of plug 260 is possible, if desired, so that the seal is maintained up to a pressure thresholds at any desired value below 100 psig. The base 273 of vent pip cap 270 can have several downwardly extending segments which fit into indentations or crevices 253 within the top surface of plastic spacer 250 as vent cap 270 is pressed onto plug 260. This is shown best in FIG. 5. After vent pip cap 270 is inserted over plug 260, thereby compressing said plug within rivet head cavity 248, vent cap 270 is welded to rivet head 247. Plug 260 is thereby maintained compressed within rivet head cavity 248. The plastic extender member 280 is placed over the vent cap head 271. The vent cap head 271 protrudes through aperture 282 within plastic extender 280. A terminal end plate 290 (negative terminal), is then welded to vent cap head 271. Vent cap 270 is thus welded to both end plate 290 and rivet 240. Terminal end plate 290 is constructed of a conductive metal having good mechanical strength and corrosion resistance such as nickel plated cold rolled steel or stainless steel, preferably, nickel plated low carbon steel. Thus, a completed end cap assembly 12 is formed with terminal end plate 290 in permanent electrical contact with current collector 163.

The completed end cap assembly 12 is then inserted into the open end 102 of casing 100. The current collector shaft 162 penetrates into anode slurry 150. The edge of metal cover 230 is welded, preferably by laser welding, to the top peripheral edge 104 of the casing. This holds the end cap assembly 12 securely in place and seals the open end 102 of the casing as shown in FIGS. 1 and 1A. End terminal plate 290 is in electrical contact with current collector 160 and anode 150, and thus forms the cell's negative terminal for the zinc/MnO2 alkaline cell embodiment described herein. It will be appreciated that the negative terminal plate 290 is electrically insulated from casing 100 by plastic extender 280. Rivet 240 and anode current collector 160 is electrically insulated from casing 100 by plastic spacer 250 and insulating sealing member 220. As shown in FIGS. 1A, 2 and 3, pip 180 at the opposing closed end of casing 100 forms the cell's positive terminal. The pip 180 can be integrally formed from the closed end 104 of the casing or may be a formed of a separate plate 184, which is separately welded to the closed end as shown in FIG. 1A. The completed cell is shown in the perspective views of FIGS. 1 and 1A and in cross sectional views of FIGS. 2 and 3.

In operation during cell discharge or storage, if the gas pressure within the cell builds up to exceed the design threshold level, plug 260 becomes unseated within rivet head cavity 248. This will allow gas to escape from within the cell interior through rivet head cavity 248, then through vent aperture 272 of vent cap 270 and to the external environment. As pressure within the cell is reduced, plug 260 becomes reseated within rivet head cavity 248.

As an added safety feature the cell can be provided with a second venting device which functions to supplement the reseatable plug vent 260. The supplemental vent may be designed to activate in a catastrophic situation, for example, if the user inadvertently attempts to recharge primary cell 10 for long periods of time using battery chargers designed for flat rechargeable cells. The cell 10 of the invention is designed to be a primary (nonrechargeable cell). Despite ample written notice on the cell label that the cell should not be recharged, it is always possible that the user will inadvertently attempt to recharge the cell in a conventional flat battery charger, for example, one designed for recharging a flat nickel metal hydride cell. If the cell is abused in this manner by attempting to recharge for a long period of time, there is risk that the internal pressure level could rise abruptly.

If cell 10 is inadvertently subjected to recharging (although it is intended as a primary nonrechargeable cell), plug vent 260 will unseat thereby releasing pressure as the internal gas pressure reaches the design threshold, desirably a pressure between about 100 and 300 psig ($6.895 \times 10^5$ and $20.69 \times 10^5$ pascal gage). Plug 260 will unseat again should the pressure again build up upon continued charging for long periods of time. Such process of plug unseating and reseating can be repeated many times resulting in a pulsed release of gas pressure from the cell interior. Under such abuse conditions there is the chance that KOH electrolyte will gradually enter and crystallize within the free space between the plug 260 and the inside surface of rivet head cavity 248 housing plug 260. (Plug 260 is held compressed within rivet head cavity 248 by vent cap 270 which is welded to the rivet head). The accumulation of such crystallized KOH reduces the amount of free space between plug 260 and the inside surface of vent cap 270. This can make it gradually more difficult for the plug 260 to properly unseat as the recharging process is continued, since there may be less free space available for plug 260 to expand into when the threshold gas pressure is reached. Accumulation of crystallized KOH within a small amount of free space within rivet head 248 can also impede proper venting of gas through vent aperture 272 in vent cap 270.

Several improvements in design are proposed herein in order to reduce the deleterious effect of such KOH crystalline buildup between plug 260 and the inside surface of vent cap 270:

The venting system of the invention may include primary and supplemental venting mechanisms. The primary venting mechanism is activated when gas pressure within the cell builds up to a design pressure threshold level, P1. It is desirable to have a supplemental venting mechanism which activates at a higher pressure level, P2, in the event that the primary vent mechanism fails to operate properly or if the cell is subjected to an abusive situation resulting in a rapid build up of gas pressure. One such abusive situation could occur, for example, if the cell were subjected inadvertently to charging for an extended period. In one specific embodiment of the invention a reseatable plug 240 is employed as a primary venting mechanism, which activates at a design threshold pressure P1, between about 100 and 300 psig. A supplemental venting mechanism can be a weak laser weld anywhere within a cut out portion of the casing body 100 or end cap assembly 12. The weak laser weld is designed to rupture when gas pressure within the cell reaches a higher pressure P2, desirably between about 400 and 800 psig. There may be a strong weld, preferably contiguous with the weak weld. The strong weld is designed to rupture at yet a higher pressure P3, desirably between about 800 and 2500 psig.

Figure 6:
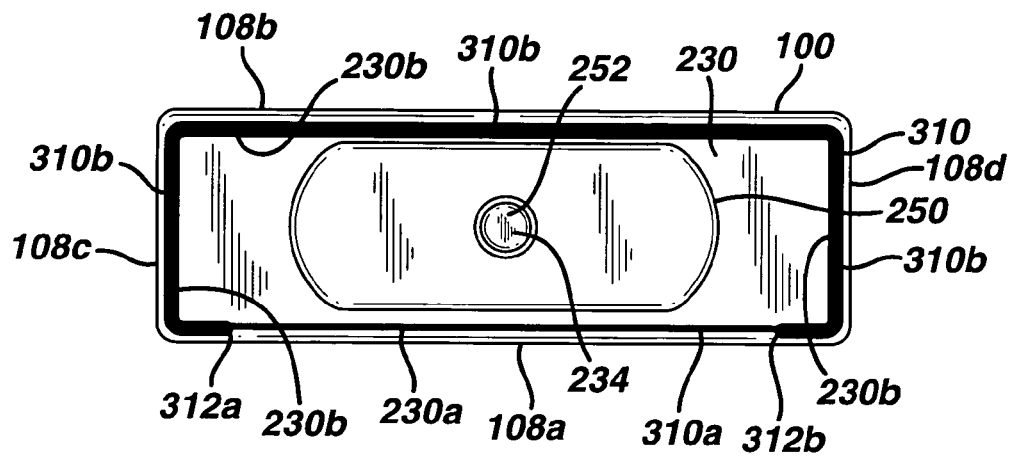
FIG. 6 is a plan view of a metal cover plate shown laser welded along its edge with a strong weld and a weak weld to the inside surface of the cell's casing.

One embodiment the supplemental venting system can be provided by forming a weak laser weld along a portion of the laser welded interface between the of metal cover 230 and inside surface of casing 100. (Metal cover 230 is used to close the open end 102 of casing 100.) Preferably, a weak laser weld 310a can be applied between a major portion of one of the metal cover long edges 230a and casing edge 108a as shown in FIG. 6. The weak laser weld 310a can be applied so that the weld thickness is such that it will crack or rupture desirably as gas within the cell builds up to a pressure of between about 400 and 800 psig ($2748 \times 10^3$ and $5515 \times 10^3$ pascal). The depth of penetration of the weak weld can be adjusted to achieve the desired rupture pressure. A rupture pressure between about 400 and 800 psig ($2748 \times 10^3$ and $5515 \times 10^3$ pascal gage) can be achieved with a depth of penetration of the laser weld between about 2 and 4 mil (0.0508 and 0.102 mm). The weak weld may desirably run along a major portion of at least one of the long edges 230a of metal cover 230. Preferably, the weak weld begins at a point 312a which is at least about 1 mm from the corner intersecting short edge 108c and long edge 108a of casing 100. Thus, for a flat 7/5-F6 cell the length of the weak weld may be at least about 10 mm, typically about 13 mm.

The remainder of the perimeter interface between the edge of metal cover 230 and the casing edge (casing edges 107c, 107d, and 106d) (FIG. 6) can be provided with a strong laser weld 310b designed to rupture at a higher pressure level, for example, a gas pressure between about 800 and 2500 psig ($5515 \times 10^3$ and $17235 \times 10^3$ pascal gage), typically between about 800 and 1600 psig ($5515 \times 10^3$ and $11030 \times 10^3$ pascal gage). The depth of penetration of the strong weld can be adjusted to achieve the desired rupture pressure. A rupture pressure between about 800 and 2500 psig ($5515 \times 10^3$ and $17235 \times 10^3$ pascal gage) can be achieved with a depth of penetration of the laser weld between about 5 and 7 mil (0.127 and 0.178 mm). The depth of penetration of the strong weld can be more finely adjusted allowing the weld to rupture at a desired pressure level, for example, between about 1300 and 1600 psig ($8962 \times 10^3$ and $11030 \times 10^3$ pascal gage).

Figure 6A:
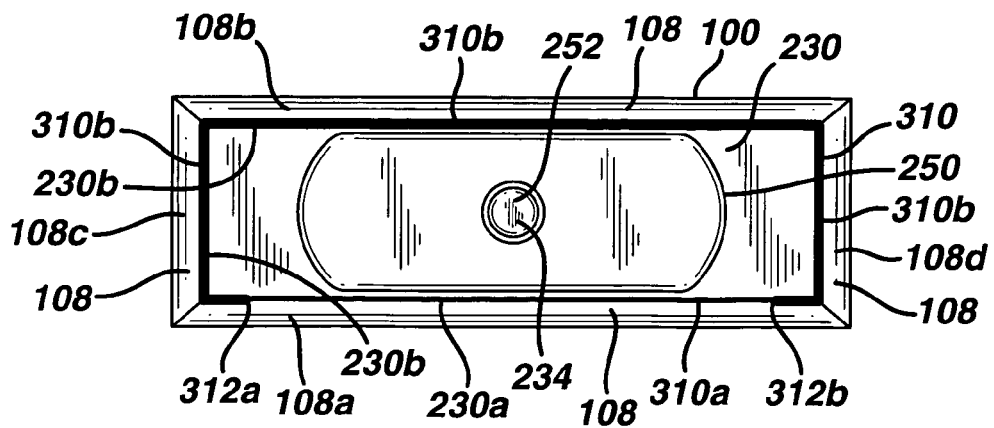
FIG. 6A is a plan view of a metal cover plate shown laser welded along its edge with a strong weld and a weak weld to the crimped edge of the cell's casing.

Although the edge of metal plate 230 is shown welded to the inside surface of metal casing 100 as shown in FIG. 6, there can be alternative embodiments wherein the edge of metal plate 230 is welded to an edge of metal casing instead of the inside surface of casing 100. One such alternative embodiment is shown in FIG. 6A. In such embodiment (FIG. 6A) the casing edge 108 defined by opposing long edges 108a and 108b and opposing short edges 108c and 108d are crimped so that such edges lie in about the same plane as metal plate 230. Thus, the edges 230a and 230b of metal plate 230 can be laser welded directly to the crimped casing edge 180. A strong laser weld 310b can be applied between plate edge 230b and casing edges 108b, 108c, and 108d; a weak laser weld 310a can be applied between plate edge 230a and casing edge 108a.

Figure 7:
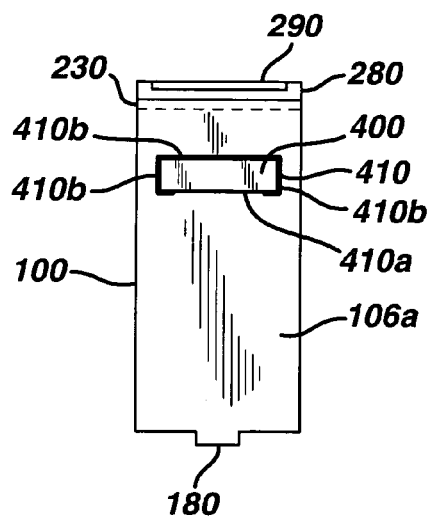
FIG. 7 is a view of the cell casing body showing an embodiment of strong and weak welds therein.
Figure 7A:
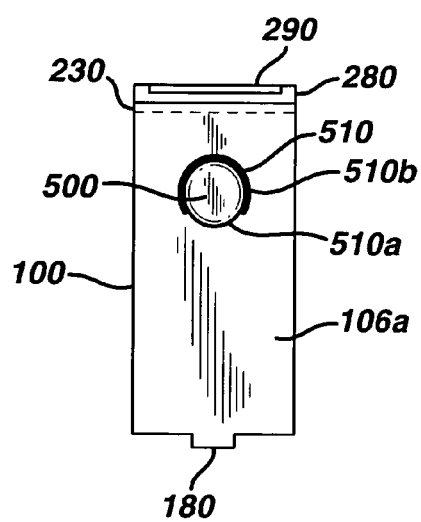
FIG. 7A is a view of the cell casing body showing an embodiment of curved strong and weak welds therein.

In yet other embodiments there can be cut out portions within the body of casing 100. The cut out portion may be of varying shape. For example, the cut out portion may be polygonal (FIG. 7) or may have at least a portion of its boundary curved (FIG. 7A). A metal plate, e.g. plate 400 (FIG. 7) or plate 500 (FIG. 7A) may by inserted into such cut out portions. The edges of metal plate 400 (FIG. 7) or metal plate 500 (FIG. 7A) may be laser welded to the casing to close the cut out portion. The welds may desirably be in the form of a strong laser weld 410b and a contiguous weak laser weld 410a as shown in the embodiment of FIG. 7. The welds may in the form of a strong laser weld 510b and preferably a contiguous weak laser weld 510a as shown in the embodiment of FIG. 7A.

The strong and weak welds can be achieved using different types of lasers operating within a range of peak power output. The following are nonlimiting examples of a weak and strong welds produced using a Nd:Yag laser. The weak weld as above described will crack or rupture as above described when gas pressure within the cell reaches a threshold pressure of between about 400 and 800 psig ($2758 \times 10^3$ and $5515 \times 10^3$ pascal gage). The strong weld will rupture when the gas pressure within the cell reaches a threshold pressure of between about 800 and 2500 psig ($5515 \times 10^3$ and $17235 \times 10^3$ pascal gage), typically between about 800 and 1600 psig ($5515 \times 10^3$ and $11030 \times 10^3$ pascal gage). The weak weld in particular provides a supplemental venting system allowing gas to escape from within the cell should the cell be abused as above described.

Alternatively, the supplemental venting mechanism may be in the form of a grooved vent, that is, one or more grooves on the surface of casing 100 which results in an underlying thinned material region. The depth of the groove and thickness of the underlying thinned material region can be adjusted so that the thinned region ruptures when gas pressure within the cell rises to a pressure P2 greater than P1. In another embodiment the reseatable plug can be eliminated and a laser weld can be used as the primary vent mechanism activating at a pressure P1. In such embodiment the supplemental venting mechanism may be a thinned material region underlying a groove on the casing surface. The thinned material may be designed to rupture at a higher pressure level P2.

In yet another embodiment there can be a plurality of grooves on the casing surface. One groove may have underlying thinned regions of small thickness allowing it to rupture as gas within the cell builds up to the design pressure level, P1. A second groove on the casing surface, which may be contiguous with or spaced apart from the first groove, may have an underlying thinned region designed to rupture if gas pressure within the cell builds up to a higher pressure, P2.

When the casing 100 is of steel, for example, nickel plated cold rolled steel or stainless steel, a groove such as groove 600a (FIG. 8) can be formed on the casing surface so that the thinned material underlying the groove will rupture when gas pressure within the cell reaches a pressure of between about 400 and 800 psig ($2758 \times 10^3$ and $5515 \times 10^3$ pascal gage). The non grooved portions of the casing wall may typically have an average wall thickness of between about 0.3 and 0.50 mm, desirably between about 0.3 and 0.45 mm. In order to achieve rupture pressures between about 400 and 800 psig ($2758 \times 10^3$ and $5515 \times 10^3$ pascal gage), the groove is formed so that the underlying thinned material has a thickness typically of between about 0.07 and 0.08 mm. In a specific nonlimiting example, if the groove is formed so that the underlying thinned material has a thickness of about 0.074 mm, such underlying material will rupture when the gas pressure within the cell reaches a level of about 435 psig ($2999 \times 10^3$ pascal gage).

A groove 600 which may, for example, be in the form of a groove 600a or 600b (FIGS. 8–8A) on the casing surface may be made by stamping the surface of the casing with a die, preferably a die having a cutting knife edge. A mandrel is held against the inside surface of the casing as the stamping die punches into the casing outside surface. For grooves formed with such stamping or cutting die, the thickness of the underlying thinned region 610 (FIG. 9) primarily determines the pressure at which the thinned region will rupture. The groove cut may desirably be V-shaped (FIG. 9), which is obtained preferably with a stamping die having a knife edge. The V shaped groove desirably has an acute angle, $\alpha$, of about 40 degrees. The groove 600 can be made by other methods, for example, by chemical etching.

Figure 8:
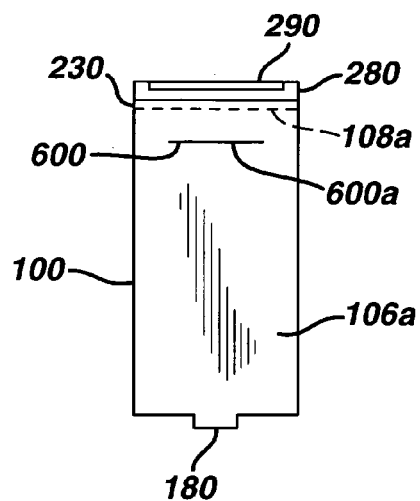
FIG. 8 is a side view of the cell showing a groove within the casing body forming an underlying region of thinned material.
Figure 8A:
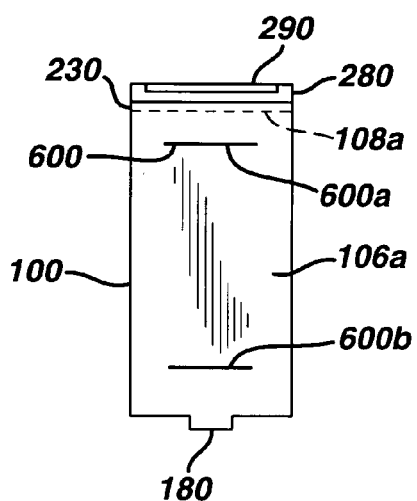
FIG. 8A is a side view of the cell showing a plurality of grooves within the casing body wherein each groove forms an underlying region of thinned material.
Figure 9:
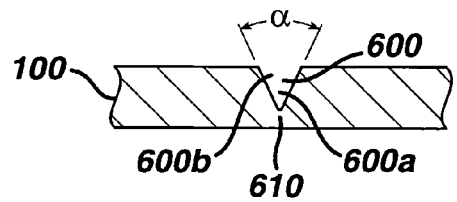
FIG. 9 is a cross sectional view of a representative groove shown in FIGS. 8 and 8A.

The thinned material underlying groove 600 is preferably the same as the casing material, typically of nickel plated cold rolled steel. The groove 600 may have boundaries which are straight or curved or may have a combination of straight and curved portions. The groove 600 may have boundaries which are rectangular, polygonal or oblong. The groove may have at least a portion of their boundaries which are convoluted, that is partially convex and partially concave. The groove boundary may be closed or open. In a preferred embodiment herein the groove can be a straight or substantially straight, preferably parallel to a wide edge 108a of the casing (FIGS. 8–8A). For example, in a 7/5-F6 size rectangular cell, the groove 600a (FIGS. 8 and 8A) can desirably be located parallel to casing wide edge 108a and about 10 mm therefrom and may have a length of about 8 mm.

There may be a second groove 600b spaced apart from a first groove 600a as shown in FIG. 8A. In a specific non limiting embodiment the second groove 600b may be parallel to groove 600a and about 10 mm form the positive terminal 180 (closed end). Groove 600b may have a length of about 8 mm. In such case the underlying material thickness of each groove 600a and 600b may be different so that the underlying material in each ruptures when gas pressure within the cell reaches different pressure levels. For example, the thinned material underlying groove a 600a can be designed to rupture when gas pressure within the cell reaches a design burst pressure of between about 250 and 800 psig. To achieve such range in burst pressure between about 250 and 800 psig ($1724 \times 10^3$ and $5515 \times 10^3$ pascal gage), the thinned material underlying groove 600a has a thickness between about 0.04 and 0.15 mm. Alternatively, the thinned material underlying groove 600a can be designed to rupture when gas pressure within the cell reaches a design burst pressure of between about 400 and 800 psig ($2758 \times 10^3$ and $5515 \times 10^3$ pascal gage). To achieve such burst pressure between 400 and 800 psig the thinned material underlying the groove 600a has a thickness between about 0.07 and 0.15 mm. The thinned material underlying second groove 600b can be designed to rupture when gas pressure within the cell ruptures in a catastrophic situation in the event that the cell be misused and gas pressure within the cell rapidly rises to a level of between about 800 and 1600 psig ($5515 \times 10^3$ and $11030 \times 10^3$ pascal gage). In order to achieve rupture at pressure levels between about 800 and 1600 psig the thinned material 610 underlying groove 600b, typically has a thickness of between about 0.15 and 0.35 mm.

EXAMPLE 1

(Weak Weld using Nd:Yag Laser)

The weak weld used to weld metal cover 230 to casing 100 along casing edge 106c (FIG. 6 or 6A) can be produced by employing an Nd:Yag laser. The laser is operated at a frequency of about 100 Hertz. The peak power output per pulse is about 35 Watts. The average power output is 0.5 Killiwatts. The pulse width (cycle time between peak power) is about 0.7 millisecond. The laser feed rate (rate of movement of the laser along weld path) is about 3 inches per minute. A uniform weld along long edge 106c of the casing is produced thereby welding abutting long edge 230a of metal cover 230 thereto. The weld had a uniform depth of penetration between about of 2 and 4 mils (0.0508 and 0.102 mm), typically about 3 mil (0.0762 mm). The weld cracks when pressure within the cell reaches a level of between about 400 and 800 psig ($2757 \times 10^3$ and $5515 \times 10^3$ pascal gage) and thereby functions as a supplemental vent should the operation of primary vent (plug 260) become compromised.

EXAMPLE 2

(Strong Weld using Nd:Yag Laser)

The strong weld used to weld metal cover 230 to casing 100 along casing edges 106d, 107c and 107d (FIG. 6 or 6A) can be produced by employing an Nd:Yag laser. The strong weld used to weld metal cover 230 to casing 100 along casing edge 106d, 107c and 107d can be produced by employing an Nd:Yag laser. The laser is operated at a frequency of about 12 Hertz. The peak power output per pulse is about 46 Watts. The average power output is 0.65 Killiwatts. The pulse width (cycle time between peak power) is about 5.9 millisecond. The laser feed rate (rate of movement of the laser along weld path) is about 2 inches per minute. A uniform weld along long edges 106d, 107c, and 107d of the casing is produced thereby welding abutting edges of metal cover 230 thereto as shown in FIG. 6. The weld had a uniform depth of penetration of between about 5 and 7 mils (0.127 and 0.178 mm), typically about 6 mil 0.152 mm). The weld cracks when pressure within the cell reaches a level of between about 800 and 2500 psig ($5515 \times 10^3$ and $17235 \times 10^3$ pascal gage), typically between about 800 and 1600 psig ($5515 \times 10^3$ and $11030 \times 10^3$ pascal).

In commercial production the above described Nd:Yag laser could be operated at higher peak power of about 125 Watts to produce the weak weld and a peak power of about 150 Watts to produce the strong weld. Such operation at higher peak power allows the laser to be moved along the weld path (feed rate) at higher speed.

Figure 2A:
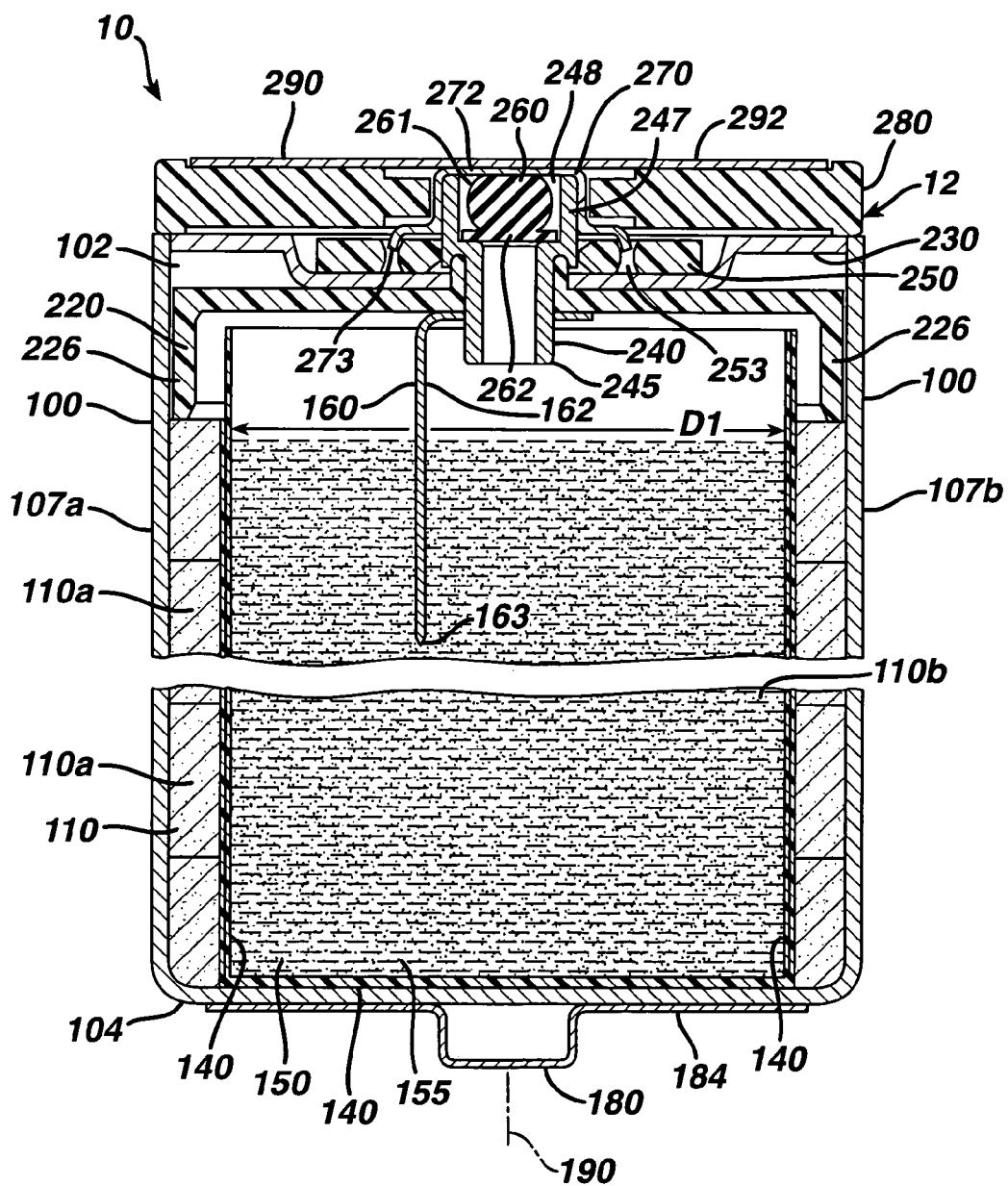
FIG. 2A is a cross sectional view of the cell shown in FIG. 1 taken along view lines 2—2 and showing a modified plug design.

Additionally in order to reduce the deleterious effect of any KOH crystalline buildup between plug 260 and the inside surface of vent cap 270, which may possibly occur if the cell is inadvertently subjected to charging, the plug 260 may be modified so that it occupies less space within the cavity in rivet head 247 housing plug 260. A specific embodiment of such improved design is shown as plug 260 in FIGS. 2A, 3A, and 4A. In the improved design of plug 260 shown in FIG. 4 the plug occupies less space within rivet head cavity 248 than the frustum design for the plug shown in FIGS. 2, 3 and 4. After the plug 260 of compressed into the rivet head cavity 248 the amount of free space within cavity 248 housing said plug is greater than about 10 percent, desirably between about 10 and 40 percent. By contrast the amount of free space within the rivet cavity of plug 260 shown in the frustum embodiment shown in FIGS. 2, 3, and 4 is typically less than about 10 percent.

It has been determined that the greater amount of free space, typically between about 10 and 40 percent within rivet head cavity 248, which is achieved with the modified plug design (FIG. 4A) assures more effective operation of the plug in an abuse situation, for example, if the cell is inadvertently subjected to charging as above described. Such modified plug 260 (FIG. 4A) desirably unseats as gas pressure within the cell reaches the design threshold level, e.g. between about 100 and 300 psig. The greater amount of free space within rivet head cavity 248 accommodates any gradual KOH crystalline buildup therein, which may occur if the cell is abused by inadvertent charging. There is nevertheless enough free space remaining within rivet head cavity 248 to allow the plug 260 to operate effectively in unseating itself to allow gas pressure to release as pressure within the cell builds up to the design threshold level.

Figure 4A:
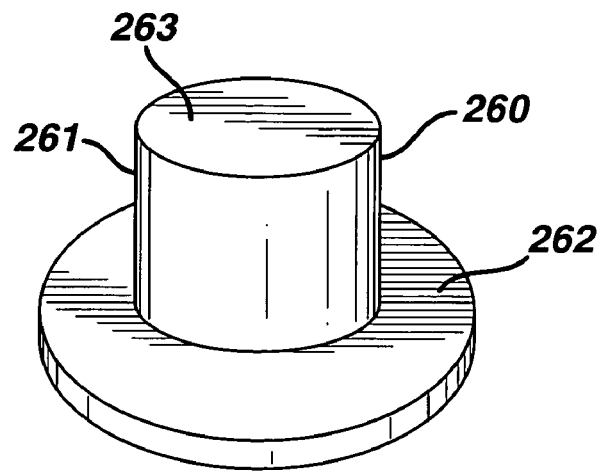
FIG. 4A is a perspective view of the modified plug shown in FIGS. 2A and 3A before it has been compressed into its housing cavity.
Figure 4B:
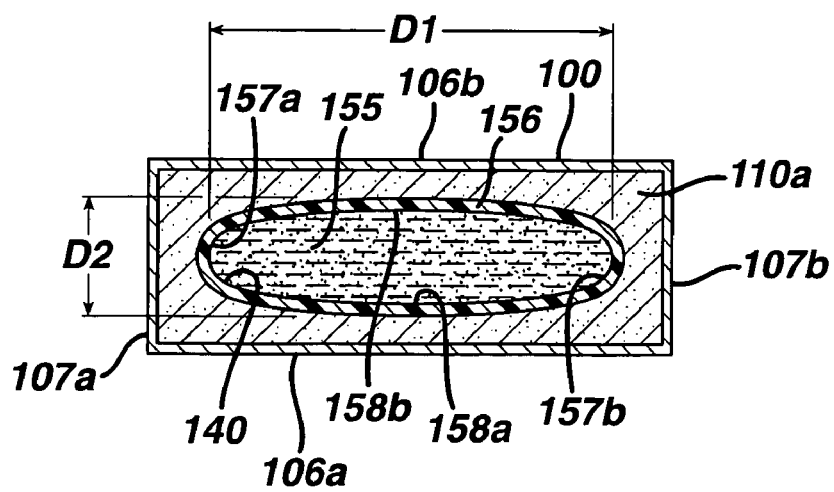
FIG. 4B is a plan view of a cross section of the cell taken in a plane perpendicular to the cell's longitudinal axis along sight lines 4B—4B of FIG. 1A to show an elongated anode cavity.
Figure 4C:
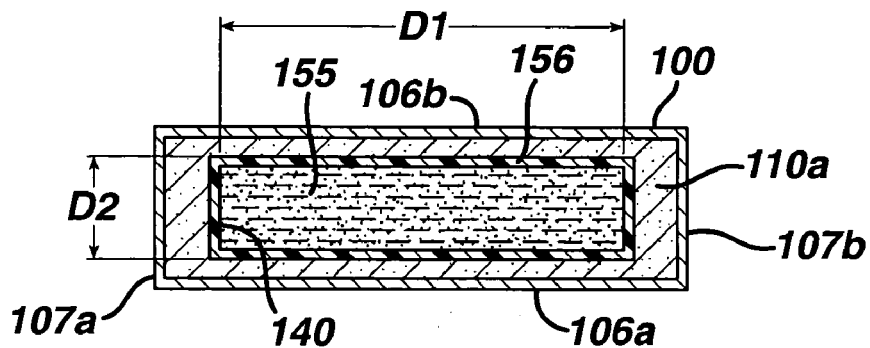
FIG. 4C is a plan view of a cross section of the cell to show another embodiment of the elongated anode cavity.
Figure 4D:
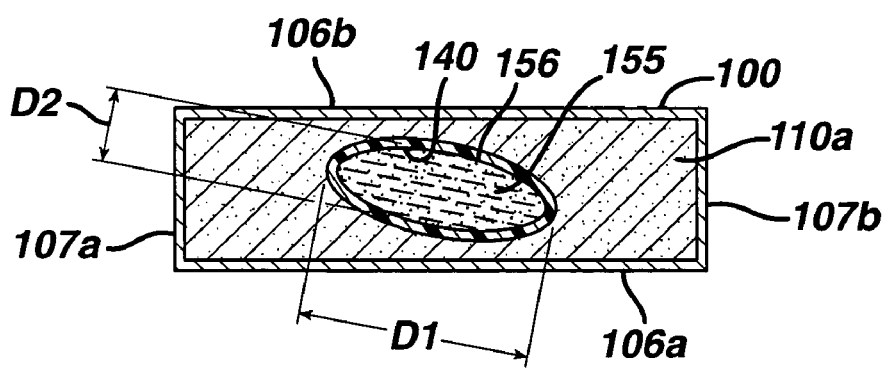
FIG. 4D is a plan view of a cross section to show a third embodiment of the elongated anode cavity.

The shape of plug 260 can be altered as shown in FIG. 4A to achieve the greater amount of free space within rivet head cavity 248. In the modified design (FIG. 4A) plug 260 has a cylindrical base 262 and integrally formed cylindrical body 261 of smaller diameter extending therefrom. The ratio of diameter of body 261 to the diameter of base 262 can be adjusted as required to achieve the desired greater amount of free space within rivet head cavity 248, typically between about 10 and 40 percent, after modified plug 260 (FIG. 4A) has been compressed within the cavity. The cylindrical shape of body 261 withstands well the pressure of compressing plug 260 within rivet head cavity 248. Modified plug 260 (FIG. 4A) is compressed within rivet head cavity 248 by applying a force to the top surface 263 of the plug and then welding vent cap 270 to the rivet head 247. This keeps plug 260 tightly seated in compressed state within rivet head cavity 248. In the compressed state the body 261 of plug 260 assumes a bulbous configuration as shown in FIGS. 1A and 2A. When gas pressure within the cell builds up to a threshold level, desirably between about 100 and 300 psig, the plug unseats itself thereby letting gas from within the cell to escape through vent apertures 272 within vent cap 270. Preferably there are at least two vent apertures 272 within vent cap 270 to assure that there will be a clear path through which gas can escape from vent cap 270 as plug 270 unseats. Plug 260 is desirably of an elastomeric, preferably rubber material which is sufficiently compressible and resilient, yet resists chemical attack or physical degradation upon contact with alkaline electrolyte. A preferred rubber material for plug 260 is vulcanized EPDM rubber, desirably having a Durometer hardness between about 80 and 85.

Although the modified configuration for plug 260 as shown in FIG. 4A is preferred, it will be appreciated that other shapes of the plug can help achieve the desired increase in free space within rivet head cavity 248 which houses the plug. For example, the body 261 of the plug could be slightly sloped instead of cylindrical as shown in FIG. 4A. Also the width of rivet head cavity can be enlarged in the direction of wide side of the cell (FIG. 2A). In such case the rivet head cavity 248 will be elongated along one axis, that is, in the direction of the wide side of the cell (FIG. 2A). However, the symmetrical (circular) rivet head cavity 248, as presently shown in the figures, is preferred.

It is not intended to restrict the invention to any particular size rectangular cell. However, by way of particular example, the alkaline cell 100 can be is a small sized rectangular (cuboid), typically having a thickness between about 5 and 10 mm, particularly a thickness between about 5 and 7 mm as measured by the outside* surface of the casing in the direction of the cell thickness. The cell width may typically be between about 12 and 30 mm and the cell length may typically be between about 40 and 80 mm. In particular the alkaline cell 10 of the invention can be used as a replacement for same sized rechargeable nickel metal hydride cells, for example, standard 7/5-F6 size rectangular cells. The 7/5-F6 size cell has thickness of 6.1 mm, width of 17.3 mm, and length of about 67.3 mm.

Chemical Compositoin of a Representative Cell

The following description of cell composition regarding chemical composition of anode 150, cathode 110 and separator 140 is applicable to the flat cell disclosed in the above described embodiment.

In the above described cell 10, the cathode 110 comprises manganese dioxide, and an anode 150 comprises zinc and electrolyte. The aqueous electrolyte comprises a conventional mixture of KOH, zinc oxide, and gelling agent. The anode material 150 can be in the form of a gelled mixture containing mercury free (zero-added mercury) zinc alloy powder. That is, the cell has a total mercury content less than about 100 parts per million parts (ppm) of zinc by weight, preferably less than 50 parts mercury per million parts of zinc by weight. The cell also preferably does not contain any added amounts of lead and thus is essentially lead-free, that is, the total lead content is less than 30 ppm, desirably less than 15 ppm of the total zinc in the anode. Such mixtures can typically contain aqueous KOH electrolyte solution, a gelling agent (e.g., an acrylic acid copolymer available under the tradename CARBOPOL C940 from B.F. Goodrich), and surfactants (e.g., organic phosphate ester-based surfactants available under the tradename GAFAC RA600 from Rhône Poulenc). Such a mixture is given only as an illustrative example and is not intended to restrict the present invention. Other representative gelling agents for zinc anodes are disclosed in U.S. Pat. No. 4,563,404.

The cathode 110 desirably has the following composition: 87–93 wt % of electrolytic manganese dioxide (e.g., Trona D from Kerr-McGee), 2–6 wt % (total) of graphite, 5–7 wt % of a 7–10 Normal aqueous KOH solution having a KOH concentration of about 30–40 wt %; and 0.1 to 0.5 wt % of an optional polyethylene binder. The electrolytic manganese dioxide typically has an average particle size between about 1 and 100 micron, desirably between about 20 and 60 micron. The graphite is typically in the form of natural, or expanded graphite or mixtures thereof. The graphite can also comprise graphitic carbon nanofibers alone or in admixture with natural or expanded graphite. Such cathode mixtures are intended to be illustrative and are not intended to restrict this invention.

The anode material 150 comprises: Zinc alloy powder 62 to 69 wt % (99.9 wt % zinc containing indium containing 200 to 500 ppm indium as alloy and plated material), an aqueous KOH solution comprising 38 wt % KOH and about 2 wt % ZnO; a cross-linked acrylic acid polymer gelling agent available commercially under the tradename "CARBOPOL C940" from B.F. Goodrich (e.g., 0.5 to 2 wt %) and a hydrolyzed polyacrylonitrile grafted onto a starch backbone commercially available commercially under the tradename "Waterlock A-221" from Grain Processing Co. (between 0.01 and 0.5 wt. %); organic phosphate ester surfactant RA-600 or dionyl phenol phosphate ester surfactant available under the tradename RM-510 from Rhone-Poulenc (between 100 and 1000 ppm). The term zinc as used herein shall be understood to include zinc alloy powder which comprises a very high concentration of zinc, for example, at least 99.9 percent by weight zinc. Such zinc alloy material functions electrochemically essentially as pure zinc.

In respect to anode 150 of the flat alkaline cell 10 of the invention, the zinc powder mean average particle size is desirably between about 1 and 350 micron, desirably between about 1 and 250 micron, preferably between about 20 and 250 micron. Typically, the zinc powder may have a mean average particle size of about 150 micron. The zinc particles in anode 150 can be of acicular or spherical shape. The spherical shaped zinc particles are preferred, since they dispense better from dispensing nozzles used to fill the relatively small anode cavity of the cell with zinc slurry. The bulk density of the zinc in the anode is between about 1.75 and 2.2 grams zinc per cubic centimeter of anode. The percent by volume of the aqueous electrolyte solution in the anode is preferably between about 69.2 and 75.5 percent by volume of the anode.

The cell 10 can be balanced in the conventional manner so that the mAmp-hr capacity of $MnO_2$ (based on 370 mAmp-hr per gram $MnO_2$) divided by the mAmp-hr capacity of zinc (based on 820 mAmp-hr. per gram zinc) is about 1. However, it is preferred to balance the cell so that the cathode is in significant excess. Preferably cell 10 is balanced so that the total theoretical capacity of the $MnO_2$ divided by the total theoretical capacity of the zinc is between about 1.15 and 2.0, desirably between about 1.2 and 2.0, preferably between about 1.4 and 1.8, more preferably between about 1.5 and 1.7. Cell balance with such cathode excess has been determined to reduce the amount of cathode expansion because there is a smaller percentage conversion of $MnO_2$ to $MnOOH$ on discharge based on total cell weight. This in turn reduces the amount of swelling of the cell casing. The above ratio of theoretical capacity of $MnO_2$ to theoretical capacity of zinc can feasibly be as high as about 2.5 or even up to about 3.0 in order to reduce overall swelling, but cell design at such higher ratios above about 2.0 more significantly reduces cell capacity and thus becomes less desirable from that standpoint.

It has been determined desirable to have the casing 100 wall thickness between about 0.30 and 0.50 mm, typically between about 0.30 and 0.45 mm, preferably between about 0.30 and 0.40 mm, more desirably between about 0.35 and 0.40. Cell 10 is preferably of cuboid shape (FIGS. 1 and 2) having an overall thickness desirably between about 5 and 10 mm. In combination therewith the cell is balanced so that the cathode is in excess. Desirably the cell is balanced so that the ratio of theoretical capacity of the $MnO_2$ (based on 370 mAmp-hr per gram $MnO_2$) divided by the mAmp-hr capacity of zinc (based on 820 mAmp-hr. per gram zinc) is between about 1.15 and 2.0, desirably between about 1.2 and 2.0, preferably between about 1.4 and 1.8. The ratio of anode thickness to the casing outside thickness is desirably between about 0.30 and 0.40. (Such thicknesses are measured along a plane perpendicular to the longitudinal axis 190, across the thickness (small dimension) of the cell.)

The separator 140 can be a conventional ion porous separator consisting of an inner layer of a nonwoven material of cellulosic and polyvinylalcohol fibers and an outer layer of cellophane. Such a material is only illustrative and is not intended to restrict this invention.

Casing 100, is preferably of nickel plated steel. Casing 100 is desirably coated on its inside surface with a carbon coating, preferably a graphitic carbon coating. Such graphitic coatings can, for example, be in the form of aqueous based graphite dispersion, which can be applied to the casing inside surface and subsequently dried under ambient conditions. The graphitic carbon improves conductivity and can indirectly reduce cell gassing by reducing the chance of surface corrosion occurring on the casing inside surface. The metallic cover 230, negative terminal plate 290 and positive terminal plates 180 are also preferably of nickel plated steel. Current collector 160 can be selected from a variety of known electrically conductive metals found to be useful as current collector materials, for example, brass, tin plated brass, bronze, copper or indium plated brass. Insulating sealing member 220 is preferably of nylon 66 or nylon 612.

The following a specific examples showing comparative performance using same size rectangular cell with different cell balance. The fresh cell in each case had a thickness of 5.6 mm, a width of 17 mm, and length of 67 mm. (All dimensions are outside dimensions without a label around the casing, unless otherwise specified.) The casing 100 wall thickness was the same at 0.38 mm for each of the cells tested. The casing 100 for each cell was nickel plated steel coated on its inside surface with graphitic carbon. The cell configuration was the same in each case, as depicted in the drawings (FIGS. 1–5). The edge of the wide portion (flange 161) of the anode current collector 160 was about 0.5 mm from the inside surface of casing 100. Circumventing skirt 226 of insulating sealing member 220 surrounded said wide portion (flange 161) of current collector 160, thereby providing a barrier between it and the inside wall surface of casing 100.

All cell components, were the same as above described and each cell tested had a vent end cap assembly 12 as shown in the figures. The only difference was in cell balance and anode composition. The comparative cell (Comparative Example) was balanced so that the balance ratio, namely, theoretical capacity of the MnO2 (based on 370 mAmp-hr per gram $MnO_2$) divided by the mAmp-hr capacity of zinc (based on 820 mAmp-hr per gram zinc) was 1.1. The test cell of Test Example 1 was balanced so that the balance ratio, namely, theoretical capacity of the $MnO_2$ divided by the theoretical capacity of the zinc was 1.25. The test cells of Test Examples 2 and 3 were balanced so that the theoretical capacity of the MnO2 divided by the theoretical capacity of the zinc was 1.6 and 2.0, respectively.

The comparative and test cells in the following examples were discharged intermittently at cycles of 90 milliwatts power on followed by three hours power off, until a cutoff voltage of 0.9 Volts was reached. (Such intermittent discharge simulates typical usage of portable solid state digital audio players, which are typically capable of using the MP3 audio format.) The actual service hours total was then recorded and the amount of swelling of the cell casing was evaluated and recorded.

COMPARATIVE EXAMPLE (Comparative Cell)

A comparative test cell 10 of rectangular (cuboid) configuration and end cap assembly shown in the drawings was prepared. The cell as defined by the casing 100 outside dimensions had a length of about 67 mm and a width of about 17 and a thickness (before discharge) of about 5.6 mm. The anode 150 and cathode 110 had the following composition.

Anode Composition:

|  | Wt. % |
| --- | --- |
| Zinc[1] | 70.0 |
| Surfactant[2] (RA 600) | 0.088 |
| Electrolyte[3] (9 Normal KOH) | 29.91 |
|  | 100.00 |

Notes:
[1]The zinc particles had a mean average particle size of about 150 micron and were alloyed and plated with indium to yield a total indium content of about 200 ppm.
[2]Organic phosphate ester-based surfactant solution RA600 from Rhône Poulenc.
[3]The electrolyte solution contained gelling agents Waterlock A221 and Carbopol C940 comprising in total about 1.5 wt. % of the electrolyte solution.

Cathode Composition:

|  | Wt. % |
| --- | --- |
| MnO$_2$ (EMD) (Trona D from Kerr McGee) | 87.5 |
| Graphite[1] (NdG15 natural graphite) | 7.4 |
| Electrolyte (9 Normal KOH) | 5.1 |
|  | 100.0 |

Notes:
[1]Graphite NdG15 is natural graphite from Nacional De Grafite.

The casing 100 wall thickness for the cell was 0.38 mm. The fresh cell 10 had a length of 67 mm, thickness of 5.6 mm and a width of 17 mm. The cell's anode 150 and cathode 110 was balanced so that the theoretical capacity of the MnO$_2$ (based on 370 mAmp-hr per gram MnO$_2$) divided by the mAmp-hr capacity of zinc (based on 820 mAmp-hr per gram zinc) was 1.1. The anode had 2.8 grams zinc. (The cathode had 6.89 grams MnO$_2$.) The anode 150, cathode 110 and separator 140 comprised about 66 percent of the external volume of casing 100 of configuration shown in FIGS. 1 and 1A. The ratio of anode thickness to the casing outside thickness was about 0.35. The thicknesses are measured along a plane perpendicular to the longitudinal axis 190, across the outside thickness (small dimension) of the cell.

The cell was discharged intermittently at cycles of 90 milliwatts with "power on" followed by three hours "power off", until a cutoff voltage of 0.9 Volts was reached. The actual service life was 24.5 hours. The casing had swelled from a thickness of 5.6 mm to a thickness of 6.13 mm. (Thickness measured between outside surface of side walls 106a and 106b shown in FIG. 1A.)

Test Cell Example 1

A test cell 10 of rectangular configuration and of same size as in the comparative example was prepared. The anode 150 and cathode 110 had the following composition.

Anode Composition:

|  | Wt. % |
| --- | --- |
| Zinc[1] | 66.0 |
| Surfactant[2] (RA 600) | 0.083 |
| Electrolyte[3] (9 Normal KOH) | 34.0 |
|  | 100.08 |

Notes:
[1]The zinc particles had a mean average particle size of about 150 micron and were alloyed and plated with indium to yield a total indium content of about 200 ppm.
[2]Organic phosphate ester-based surfactant solution RA600 from Rhône Poulenc
[3]The electrolyte solution contained gelling agents Waterlock A221 and Carbopol C940 comprising in total about 1.5 wt. % of the electrolyte solution.

Cathode Composition:

|  | Wt. % |
| --- | --- |
| MnO$_2$ (EMD) (Trona D from Kerr McGee) | 87.5 |
| Graphite[1] (NdG15 natural graphite) | 7.4 |
| Electrolyte (9 Normal KOH) | 5.1 |
|  | 100.0 |

Notes:
[1]Graphite NdG15 is natural graphite from Nacional De Grafite.

The casing 100 wall thickness for the test cell was 0.38 mm. The fresh cell 10 had a length of 67 mm, thickness of 5.6 mm and a width of 17 mm. The cell's anode 150 and cathode 110 was balanced so that the theoretical capacity of the MnO$_2$ (based on 370 mAmp-hr per gram MnO$_2$) divided by the mAmp-hr capacity of zinc (based on 820 mAmp-hr per gram zinc) was 1.25. The anode had 2.56 grams of zinc. (The cathode had 7.11 grams MnO$_2$.) The anode, cathode, electrolyte and separator comprised about 66 percent of the external volume of casing 100, that is, as measured between its closed end 104 and open end 102. The ratio of anode thickness to the casing outside thickness was about 0.35. The thicknesses are measured along a plane perpendicular to the longitudinal axis 190, across the outside thickness (small dimension) of the cell.

The cell was discharged intermittently at cycles of 90 milliwatts with "power on" followed by three hours "power off", until a cutoff voltage of 0.9 Volts was reached. The actual service life was 24.3 hours. The casing had swelled from a thickness of 5.6 mm to a thickness of 6.03 mm. (Thickness measured between outside surface of side walls 106a and 106b shown in FIG. 1A.) The service hours were about the same as in the comparative example, however, the casing swelling was less.

Test Cell Example 2

A test cell 10 of rectangular configuration and of same size as in the comparative example was prepared. The anode 150 and cathode 110 had the following composition.

Anode Composition:

|  | Wt. % |
|---|---|
| Zinc[1] | 60.0 |
| Surfactant[2] (RA 600) | 0.083 |
| Electrolyte[3] (9 Normal KOH) | 39.92 |
|  | 100.00 |

Notes:
[1]The zinc particles had a mean average particle size of about 150 micron and were alloyed and plated with indium to yield a total indium content of about 200 ppm.
[2]Organic phosphate ester-based surfactant solution RA600 from Rhône Poulenc
[3]The electrolyte solution contained gelling agents Waterlock A221 and Carbopol C940 comprising in total about 1.5 wt. % of the electrolyte solution.

Cathode Composition:

|  | Wt. % |
|---|---|
| $MnO_2$ (EMD) (Trona D from Kerr McGee) | 87.5 |
| Graphite[1] (NdG15 natural graphite) | 7.4 |
| Electrolyte (9 Normal KOH) | 5.1 |
|  | 100.0 |

Notes:
[1]Graphite NdG15 is natural graphite from Nacional De Grafite.

The casing 100 wall thickness for the test cell was 0.38 mm. The fresh cell 10 had a length of 67 mm, thickness of 5.6 mm and a width of 17 mm. The cell's anode 150 and cathode 110 was balanced so that the theoretical capacity of the $MnO_2$ (based on 370 mAmp-hr per gram $MnO_2$) divided by the mAmp-hr capacity of zinc (based on 820 mAmp-hr per gram zinc) was 1.6. The anode had 2.01 grams of zinc. (The cathode had 7.13 grams $MnO_2$.) The anode, cathode and separator comprised about 66 percent of the external volume of casing 100. The ratio of anode thickness to the casing outside thickness was about 0.35.

The thicknesses are measured along a plane perpendicular to the longitudinal axis 190, across the outside thickness (small dimension) of the cell.

The cell was discharged intermittently at cycles of 90 milliwatts with "power on" followed by three hours "power off", until a cutoff voltage of 0.9 Volts was reached. The actual service life was 20.9 hours. The casing had swelled from a thickness of 5.6 mm to a thickness of 5.95 mm. (Thickness measured between outside surface of side walls 106a and 106b shown in FIG. 1A).

Test Cell Example 3

A test cell 10 of rectangular configuration and of same size as in the comparative example was prepared. The anode 150 and cathode 110 had the following composition.

Anode Composition:

|  | Wt. % |
|---|---|
| Zinc[1] | 52.0 |
| Surfactant[2] (RA 600) | 0.083 |
| Electrolyte[3] (9 Normal KOH) | 47.92 |
|  | 100.00 |

Notes:
[1]The zinc particles had a mean average particle size of about 150 micron and were alloyed and plated with indium to yield a total indium content of about 200 ppm.
[2]Organic phosphate ester-based surfactant solution RA600 from Rhône Poulenc
[3]The electrolyte solution contained gelling agents Waterlock A221 and Carbopol C940 comprising in total about 1.5 wt. % of the electrolyte solution.

Cathode Composition:

|  | Wt. % |
|---|---|
| $MnO_2$ (EMD) (Trona D from Kerr McGee) | 87.5 |
| Graphite[1] (NdG15 natural graphite) | 7.4 |
| Electrolyte (9 Normal KOH) | 5.1 |
|  | 100.0 |

Notes:
[1]Graphite NdG15 is natural graphite from Nacional De Grafite.

The casing 100 wall thickness for the test cell was 0.38 mm. The fresh cell 10 had a length of 68 mm, thickness of 5.6 mm and a width of 17 mm. The cell's anode 150 and cathode 110 was balanced so that the theoretical capacity of the $MnO_2$ (based on 370 mAmp-hr per gram $MnO_2$) divided by the mAmp-hr capacity of zinc (based on 820 mAmp-hr per gram zinc) was 2.0. The anode had 1.61 grams of zinc. (The cathode had 7.13 grams $MnO_2$.) The anode, cathode and separator comprised about 66 percent of the external volume of casing 100. The ratio of anode thickness to the casing outside thickness was about 0.35.

The thicknesses are measured along a plane perpendicular to the longitudinal axis 190, across the outside thickness (small dimension) of the cell.

The cell was discharged intermittently at cycles of 90 milliwatt with "power on" followed by three hours "power off", until a cutoff voltage of 0.9 Volts was reached. The actual service life was 18.5 hours. The casing had swelled from a thickness of 5.6 mm to a thickness of 5.87 mm. (Thickness measured between outside surface of side walls 106a and 106b shown in FIG. 1A).

DISCUSSION OF THE TEST RESULTS

In the above tests, the same size flat cell has been balanced at progressively higher balance ratios. The edge of the wide portion (flange 161) of the anode current collector 160 was about 0.5 mm from the inside surface of casing 100 and was surrounded by insulating barrier 226. The balance ratios have been defined as the theoretical capacity of the $MnO_2$ (based on 370 mAmp-hr per gram $MnO_2$) divided by the mAmp-hr capacity of zinc (based on 820 mAmp-hr per gram zinc). In the above Comparative Test swelling of the flat test cell increases significantly from an overall thickness of 5.6 mm to 6.13 mm when the cell's balance ratio (theoretical capacity of $MnO_2$ to theoretical capacity of zinc) is about 1.1. In test Example 1 (balance ratio of 1.25) the cell swells less, namely from 5.6 mm to 6.03 mm. In test Example 2 (balance ratio of 1.6) the cell swells from 5.6 mm to 5.95 mm. In test Example 3 (balance ratio of 2.0) the cell swells even less from 5.6 mm to 5.87 mm. The cell service life becomes moderately less (from 24.5 hours to 20.9 hours) as balance ratios increase between 1.1 and 1.6 and more significantly less (18.5 hours) at the highest balance ratio of 2.0.

Although the preferred embodiments of the invention have been described with respect to a flat alkaline battery having the overall shape of a cuboid (rectangular parallelepiped), it will be appreciated that variations of such overall shape are possible and are intended to fall within the concept of the invention. In the case of a flat battery, for example, in the shape of a cuboid (rectangular parallelepiped), the terminal ends of the housing could be slightly outwardly or inwardly tapered, yet maintaining their rectangular configuration. The overall appearance of such varied shape is still essentially that of a cuboid and is intended to fall within the meaning of cuboid or legal equivalent thereof. Other variation to the overall shape such as altering slightly the angle that the ends of the battery make with any one of the sides of housing, so that the parallelepiped deviates slightly from strict rectangular, is also intended to fall within the meaning of cuboid (rectangular parallelepiped) as used herein and in the claims.

The present invention is intended to extend desirably to an overall battery shape that is flat in that a side of the outer casing along the length of the casing is substantially flat. Thus, it shall be understood also that the term "flat" is intended to extend to and include surfaces that are substantially flat in that the degree of curvature of such surface may be slight. In particular the concept of the present invention is intended to extend to flat batteries wherein a side of the battery casing surface along the length of the casing has a flat polygonal surface. The battery may thus have the overall shape of a polyhedron with all sides of the outer casing being polygonal. The invention is also intended to extend to batteries wherein a side of the battery casing along its length has a flat surface, which is a parallelogram and wherein the overall shape of the battery is prismatic.

What is claimed is:

1. A primary alkaline cell comprising a negative and a positive terminal, and an outer housing having a pair of opposing flat sides running along a portion of the length of said housing; said housing having a closed end and opposing open end and said housing not having any integral cylindrical sections; said cell further comprising an anode comprising zinc and a cathode comprising $MnO_2$ within said housing, a separator between said anode and cathode, and an end cap assembly sealing the open end of said housing;

wherein the cathode comprises at least one cathode slab having an opening defined therethrough devoid of cathode material, with at least a portion of the outer surface of said cathode contacting the inside surface of said housing, wherein the cathode comprises a plurality of rectangular shaped cathode slabs; wherein each of said slabs has a central opening devoid of cathode material; wherein said cathode slabs are stacked within the housing along the cell's central longitudinal axis so that said openings devoid of cathode material form a continuous central core along said longitudinal axis, with the outer surface of said cathode contacting the inside surface of said housing;

wherein the boundary perimeter defining said central opening within said rectangular cathode slabs has an oblong configuration with a long dimension (D1) defining the length of said opening and a short dimension (D2) defining the width of said opening.

2. The alkaline cell of claim 1 wherein at least a portion of said central opening within said cathode slabs forms a cavity for housing said anode.

3. The alkaline cell of claim 2 wherein said boundary perimeter defining said central opening within said cathode slabs has at least one of a rectangular and elliptical configuration.

4. The alkaline cell of claim 1 wherein the ratio of said long diameter (D1) to said short diameter (D2) is greater than 1.0.

5. The alkaline cell of claim 2 wherein said boundary defining said central opening within said rectangular cathode slabs has an elliptical configuration.

6. The alkaline cell of claim 1 wherein said outer housing is of cuboid shape and wherein said end cap assembly comprises a rectangular end plate forming said negative terminal.

7. The alkaline cell of claim 2 wherein the anode is located within said central opening with the separator between said anode and said cathode.

8. The alkaline cell of claim 1 wherein the cell comprises alkaline electrolyte comprising an aqueous solution of potassium hydroxide.

9. The alkaline cell of claim 1 wherein the cell is electrochemically balanced so that the cathode is in excess such that the ratio of theoretical mAmp-hr capacity of the $MnO_2$ based on a theoretical specific value of 370 mAmp-hr per gram $MnO_2$, divided by the mAmp-hr capacity of zinc based on a theoretical specific value of 820 mAmp-hr per gram zinc, is between about 1.15 and 2.0.

10. The alkaline cell of claim 1 wherein the cell is balanced so that the cathode is in excess such that the ratio of theoretical capacity of the $MnO_2$ based on a theoretical specific value of 370 mAmp-hr per gram $MnO_2$, divided by the mAmp-hr capacity of zinc based on a theoretical specific value of 820 mAmp-hr per gram zinc, is between about 1.2 and 2.0.

11. The alkaline cell of claim 1 wherein the cell is balanced so that the cathode is in excess such that the ratio of theoretical capacity of the $MnO_2$ based on a theoretical specific value of 370 mAmp-hr per gram $MnO_2$, divided by the mAmp-hr capacity of zinc based on a theoretical specific value of 820 mAmp-hr per gram zinc, is between about 1.4 and 1.8.

12. The alkaline cell of claim 1 wherein said cell has an overall thickness of between about 5 and 10 mm.

13. The alkaline cell of claim 7 wherein the end cap assembly has a vent mechanism therein which activates when the gas pressure within the cell reaches a level between about 100 and 300 psig ($6.895 \times 10^5$ and $20.69 \times 10^5$ pascal gage) allowing gas from within the cell to escape from the cell interior to the external environment.

14. The alkaline cell of claim 13 wherein the end cap assembly has a second vent mechanism therein which activates when the gas pressure within the cell reaches a level between about 400 and 800 psig ($2758 \times 10^3$ and $5515 \times 10^3$ pascal).

15. The alkaline cell of claim 1 wherein the housing comprises metal having a wall thickness of between about 0.30 mm and 0.45 mm.

16. The alkaline cell of claim 1 wherein the housing comprises metal having a wall thickness of between about 0.30 mm and 0.50 mm.

17. The alkaline cell of claim 1 wherein said housing comprises steel.

* * * * *